US011942015B2

(12) United States Patent
Cheng et al.

(10) Patent No.: US 11,942,015 B2
(45) Date of Patent: *Mar. 26, 2024

(54) CHANNEL CIRCUIT OF SOURCE DRIVER FOR INCREASING OPERATION FREQUENCY OF DISPLAY PANEL

(71) Applicant: Novatek Microelectronics Corp., Hsinchu (TW)

(72) Inventors: Yen-Cheng Cheng, Hsinchu (TW); Hsiu-Hui Yang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,662

(22) Filed: Oct. 20, 2021

(65) Prior Publication Data

US 2022/0044618 A1 Feb. 10, 2022

Related U.S. Application Data

(60) Division of application No. 16/517,674, filed on Jul. 22, 2019, now Pat. No. 11,158,234, which is a (Continued)

(51) Int. Cl.
*G09G 3/20* (2006.01)

(52) U.S. Cl.
CPC ... *G09G 3/2074* (2013.01); *G09G 2310/0297* (2013.01); *G09G 2320/0276* (2013.01); *G09G 2320/0673* (2013.01)

(58) Field of Classification Search
CPC ......... G09G 3/2074; G09G 2310/0297; G09G 2320/0276; G09G 2320/0673
See application file for complete search history.

(56) References Cited

U.S. PATENT DOCUMENTS

| | | | |
|---|---|---|---|
| 8,018,444 | B2 | 9/2011 | Park et al. |
| 8,648,779 | B2 | 2/2014 | Hsueh et al. |

(Continued)

FOREIGN PATENT DOCUMENTS

| | | |
|---|---|---|
| CA | 2381626 | 2/2001 |
| CN | 1956043 | 5/2007 |

(Continued)

OTHER PUBLICATIONS

Xu Da-Peng, "Design of Display System for High Frame Rate Digital Camera", OME Information, vol. 27, No. 11, with English abstract, Nov. 25, 2010, pp. 1-5.

(Continued)

*Primary Examiner* — Wing H Chow
(74) *Attorney, Agent, or Firm* — JCIPRNET

(57) ABSTRACT

A source driver, including a plurality of channel circuits, each of the plurality of channel circuits including a first digital-to-analog converter (DAC), a second DAC, a first switch, a second switch and an output buffer circuit, is provided. The output terminal of the output buffer circuit is configured to be coupled to a data line of a display panel. An output terminal of the first DAC is coupled to a first input terminal among the input terminals of the output buffer circuit. An output terminal of the second DAC is coupled to a second input terminal among the input terminals of the output buffer circuit. The first switch is disposed along a first signal path between the output terminal of the first DAC and the output terminal of the output buffer circuit. The second switch is disposed along a second signal path between the output terminal of the second DAC and the output terminal of the output buffer circuit.

24 Claims, 12 Drawing Sheets

Related U.S. Application Data continuation-in-part of application No. 16/293,613, filed on Mar. 5, 2019, now Pat. No. 10,848,149.

(60) Provisional application No. 62/701,833, filed on Jul. 22, 2018.

(56) References Cited

U.S. PATENT DOCUMENTS

| | | | | |
|---|---|---|---|---|
| 2002/0021606 | A1 | 2/2002 | Tsuchi | |
| 2003/0025663 | A1* | 2/2003 | Waterman | G09G 3/3688 345/89 |
| 2007/0091031 | A1 | 4/2007 | Park et al. | |
| 2007/0132674 | A1 | 6/2007 | Tsuge | |
| 2008/0043128 | A1 | 2/2008 | Poonnen et al. | |
| 2011/0090198 | A1 | 4/2011 | Hsueh et al. | |
| 2014/0160172 | A1* | 6/2014 | Lee | G09G 3/3607 345/690 |

FOREIGN PATENT DOCUMENTS

| | | |
|---|---|---|
| CN | 104715729 | 6/2015 |
| GB | 201320734 | 1/2014 |
| JP | 2004046054 | 2/2004 |
| JP | 2016070998 | 5/2016 |
| KR | 20110043426 | 4/2011 |

OTHER PUBLICATIONS

“Office Action of China Counterpart Application”, dated Aug. 22, 2022, p. 1-p. 13.

“Notice of allowance of China Counterpart Application”, dated Jan. 3, 2023, p. 1-p. 4.

* cited by examiner

CHANNEL CIRCUIT OF SOURCE DRIVER FOR INCREASING OPERATION FREQUENCY OF DISPLAY PANEL

CROSS REFERENCE TO RELATED APPLICATION

This application is a divisional application of and claims the priority benefit of U.S. patent application Ser. No. 16/517,674, filed on Jul. 22, 2019. The U.S. patent application Ser. No. 16/517,674 is a continuation-in-part application of and claims the priority benefit of a prior application Ser. No. 16/293,613, filed on Mar. 5, 2019. The prior application Ser. No. 16/293,613 claims the priority benefits of U.S. provisional application Ser. No. 62/701,833, filed on Jul. 22, 2018. The entirety of the above-mentioned patent applications is hereby incorporated by reference herein and made a part of this specification.

BACKGROUND

Field of the Invention

The invention relates to an electronic circuit and more particularly, to a channel circuit of a source driver.

Description of Related Art

FIG. 1 is a schematic circuit block diagram illustrating a channel circuit 10 of a source driver of the related art. The channel circuit 10 includes a digital-to-analog converter (DAC) 11 and an output buffer circuit 12. An output terminal of the output buffer circuit 12 is coupled to a data line 21 of a display panel 20. An output terminal of the DAC 11 is coupled to an input terminal of the output buffer circuit 12 through a metal line 13. The DAC 11 may convert digital pixel data D11 into an analog signal and output the analog signal to the output buffer circuit 12 through the metal line 13. The output buffer circuit 12 may output a driving signal corresponding to the analog signal to the data line 21 of the display panel 20.

After the analog signal output by the DAC 11 is transited, a signal level of the metal line 13 needs a period of time to return back to be stable (to be transited to a new level). Generally, the metal line 13 has a parasitic capacitance (a trace capacitance) C13, and the input terminal of the output buffer circuit 12 has a parasitic capacitance (an input capacitance) C12. The parasitic capacitances C12 and C13 are one of the factors to determine a slew rate of a signal of the input terminal of the output buffer circuit 12. In any way, as an operation frequency of the display panel 20 increases, it represents that a line driving period of the data line 21 may be shortened. The increase of the operation frequency of the display panel 20 may usually be restricted by the slew rate of the signal of the input terminal of the output buffer circuit 12.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a source driver including a plurality of channel circuits, which facilitate increasing an operation frequency of a display panel.

According to an embodiment of the invention, a source driver includes a plurality of channel circuits, wherein each of the channel circuits includes an output buffer circuit, a plurality of digital-to-analog converters, a first switch and a second switch. An output terminal of the output buffer circuit is configured to output a driving voltage according to a gamma voltage to a data line of a display panel in a scan line period. The digital-to-analog converters include a first digital-to-analog converter and a second digital-to-analog converter. An output terminal of the first digital-to-analog converter is coupled to a first input terminal of the output buffer circuit. An output terminal of the second digital-to-analog converter is coupled to a second input terminal of the output buffer circuit. The first switch is disposed along a first signal path between the output terminal of the first digital-to-analog converter and the output terminal of the output buffer circuit. The second switch is disposed along a second signal path between the output terminal of the second digital-to-analog converter and the output terminal of the output buffer circuit. A first output voltage range of the first digital-to-analog converter is different from a second output voltage range of the second digital-to-analog converter.

According to an embodiment of the invention, a source driver includes a plurality of channel circuits, wherein each of the channel circuits includes an output buffer circuit and a plurality of digital-to-analog converters. The output buffer circuit at least has a plurality of input terminals and an output terminal, wherein the output terminal of the output buffer circuit is configured to be coupled to a data line of a display panel. The digital-to-analog converters comprise a first digital-to-analog converter and a second digital-to-analog converter. An output terminal of the first digital-to-analog converter is coupled to a first input terminal among the input terminals of the output buffer circuit. An output terminal of the second digital-to-analog converter is coupled to a second input terminal among the input terminals of the output buffer circuit. For each value of the pixel data, one of the first digital-to-analog converter and the second digital-to-analog converts the pixel data and the other one of the first digital-to-analog converter and the second digital-to-analog does not convert the-pixel data. Which one of the first digital-to-analog converter and the second digital-to-analog converts the pixel data depends upon the value of the pixel data.

Based on the above, the channel circuit of the source driver provided by the embodiments of the invention has the plurality of digital-to-analog converters. Any one of the digital-to-analog converters can charge or discharge (i.e., output an analog signal to) a corresponding signal path among the plurality of signal paths of the output buffer circuit. When one of the digital-to-analog converters charges or discharges one of the signal paths, another corresponding signal path among the signal paths of the output buffer circuit can provide a corresponding driving signal to the data line of the display panel. A switching operation among the signal paths can facilitate increasing the operation frequency of the display panel.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
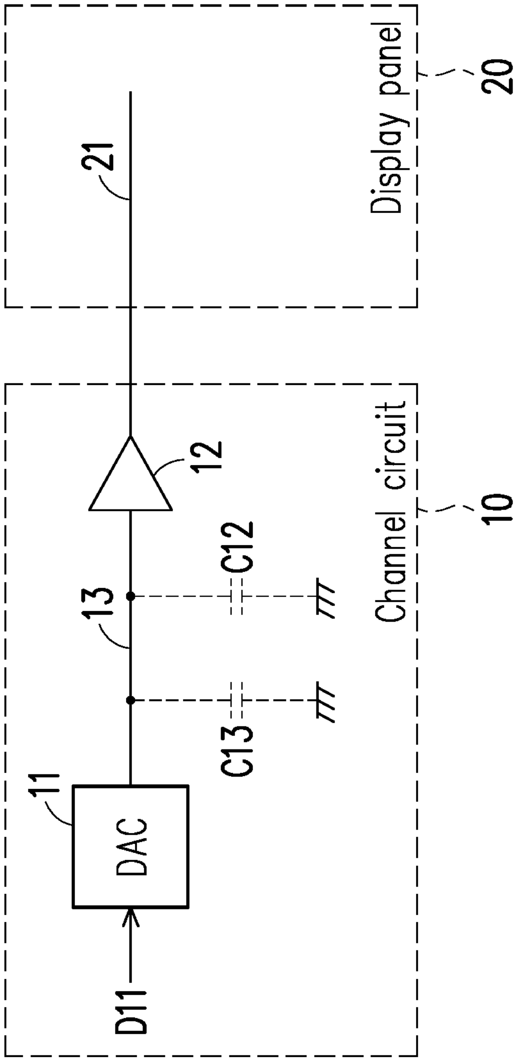
FIG. 1 (PRIOR ART)
FIG. 1 is a schematic circuit block diagram illustrating a channel circuit of a source driver of the related art.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. Moreover, wherever possible, components/members/steps using the same referral numerals in the drawings and description refer to the same or like parts. Components/members/steps using the same referral numerals or using the same terms in different embodiments may cross-refer related descriptions.

Figure 2:
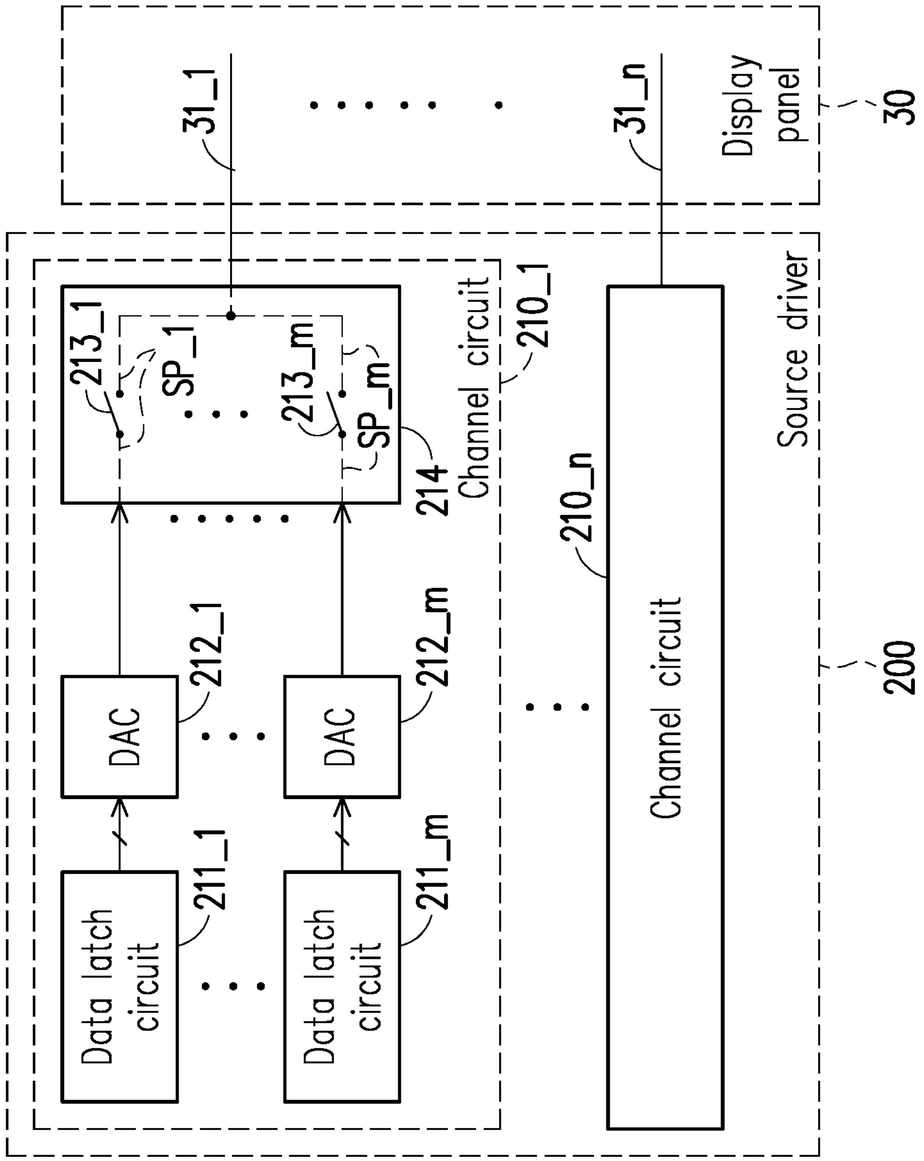
FIG. 2 is a schematic circuit block diagram illustrating a channel circuit of a source driver according to an embodiment of the invention.

FIG. 2 is a schematic circuit block diagram illustrating a channel circuit 210_1 of a source driver 200 according to an embodiment of the invention. The source driver 200 includes n channel circuits, for example, channel circuits 210_1 to **210_*n* illustrated in FIG. 2. The number n of the channel circuits may be determined according to a design requirement. Any one of the channel circuits 210_1 to 210_*n* may be configured to couple to a corresponding data line among a plurality of data lines 31_1 to 31_*n* of a display panel 30. Based on driving operations performed on the data lines 31_1 to 31_*n* by the channel circuits 210_1 to 210_*n*, the display panel 30 may display images. The display panel 30 illustrated in FIG. 2 may be inferred with reference to the description related to the display panel 20 illustrated in FIG. 1, and the data lines 31_1 to 31_*n* illustrated in FIG. 2 may be inferred with reference to the description related to the data line 21 illustrated in FIG. 1**, which will not be repeated.

Implementation details related to the channel circuit 210_1 illustrated in FIG. 2 will be described below. Another one of the channel circuits (e.g., the channel circuit **210_*n*) in the source driver 200 may be inferred with reference to the description related to the channel circuit 210_1 and thus, will not be repeated. In the embodiment illustrated in FIG. 2, the channel circuit 210_1 includes m data latch circuits (for example, data latch circuits 211_1 to 211_*m*), m digital-to-analog converters (DACs) (for example, DACs 212_1 to 212_*m*), m switches (for example, switches 213_1 to 213_*m*) and an output buffer circuit 214**. The number m may be determined according to a design requirement, and m is greater than 1.

With suitable collaboration between the data latch circuits 211_1 to **211_*m* and between DACs 212_1 to 212_*m*, data processing efficacy (at least one of power consumption or processing speed) can be improved. To achieve this, an input terminal of each of the data latch circuits 211_1 to 211_*m* is configured to receive a respective part of or all of bit data of pixel data. In one example, the data latch circuits 211_1 to 211_*m* can be configured to latch the same input level range of pixel data but different pixel locations (such as different scan lines) in each frame. In another example, the data latch circuits 211_1 to 211_*m* can be configured to receive different input level ranges of data. In addition, the data latch circuits 211_1 to 211_*m*** can be configured to latch data according to various timings, which can be determined by design requirements and/or data contents.

An output terminal of the data latch circuit 211_1 is coupled to an input terminal of the DAC 212_1, an output terminal of the DAC 212_1 is coupled to an input terminal (for example, a first input terminal) among a plurality of input terminals of the output buffer circuit 214. By deducing in the same way, an output terminal of the data latch circuit **211_*m* is coupled to an input terminal of the DAC 212_*m*, and an output terminal of the DAC 212_*m* is coupled to another input terminal (for example, a second input terminal) among the input terminals of the output buffer circuit 214**.

The data latch circuit 211_1 can be configured to load data according to a first loading timing, and the data latch circuit **211_*m* such as the data latch circuit 211_2 can be configured to load data according to a second loading timing which may be different from the first loading timing. In addition, the first loading timing may be related to a switching timing of the switch 213_1 and the second loading timing may be related to a second switching timing of the switch 213_*m*, which may be different from the switching timing of the switch 213_1. In other words, the loading timings and the switching timings may be designed to be collaborated or matched with each other. For example, the switch 213_1 can be turned on to serve as a signal path for the pixel data after the pixel data is loaded by the data latch circuit 211_1 and processed by the DAC 212_1. Similarly, the switch 213_2 can be turned on to serve as a signal path for the pixel data after the pixel data is loaded by the data latch circuit 211_2 and processed by the DAC 212_2**.

In some embodiments, each of the first loading timing and the second loading timing depends upon what pixel data arranged to be latched by the data latch circuits 211_1 and 211_2 in a frame. For example, in some embodiments, each of the first loading timing and the second loading timing depends upon a location (such as which scan line where the pixel data is located) of the pixel data to be latched by the data latch circuits 211_1 and 211_2 in a frame respectively. In some other embodiments, each of the first loading timing and the second loading timing depends upon at least one bit of the pixel data. The at least one bit may be related to the input level range of data arranged to be latched by the data latch circuits 211_1 and 211_2 in a frame.

An output terminal of the output buffer circuit 214 is configured to couple to the data line 31_1 of the display panel 30. The output buffer circuit 214 can have m signal paths, for example, signal paths SP_1 to SP_*m*. The switch 213_1 can be disposed along the signal path SP_1 between the output terminal of the DAC 212_1 and the output terminal of the output buffer circuit 214. By deducing in the same way, the switch 213_*m* can be disposed on the signal path SP_*m* between the output terminal of the DAC 212_*m* and the output terminal of the output buffer circuit 214. The switches 213_1 to 213_*m* can be respectively turned on at different times.

For example, in a first period, the switch 213_1 is turned on to activate the signal path SP_1, and the switch 213_*m* is turned off to deactivate the signal path SP_*m*. When the signal path SP_1 is activated, a first gamma voltage output by the DAC 212_1 may be transmitted via the signal path SP_1. Thus, the output buffer circuit 214 may output a driving voltage to the data line 31_1 of the display panel 30 according to the first gamma voltage. During a period in which the signal path SP_*m* is deactivated, the DAC 212_*m* may output a second gamma voltage to the signal path SP_*m*, but the signal path SP_*m* does not transmit the second gamma voltage. During a second period, which may be following the first period, the switch 213_1 is turned off to deactivate the signal path SP_1, and the switch 213_*m* is turned on to activate the signal path SP_*m*. When the signal path SP_*m* is activated, the second gamma voltage output by the DAC 212_*m* on the signal path SP_*m*. Thus, the output buffer circuit 214 may output a corresponding driving voltage to the data line 31_1 of the display panel 30 according to the second gamma voltage. During a period in which the signal path SP_1 is deactivated, the DAC 212_1 may output a third gamma voltage to the signal path SP_1, but the signal path SP_1 does not transmit the third gamma voltage.

In the same or another example, during a first period which may be a scan line period, the output buffer circuit 214 may select to output a first driving signal related to a signal of the first input terminal of the output buffer circuit 214 to the data line 31_1 via the output terminal of the output buffer circuit 214, and the data latch circuit 211_*m* may latch and output the respective part of or all of the bit data of the pixel data to the input terminal of the DAC 212_*m*. During a second period, the data latch circuit 211_1 may latch and output the respective part of or all of the bit data of the pixel data to the input terminal of the DAC 212_1, and the output buffer circuit 214 may select to output a second driving signal related to a signal of the second input terminal of the output buffer circuit 214 to the data line 31_1 via the output terminal of the output buffer circuit 214.

Based on the implementation manner described above, any one of the DACs 212_1 to 212_*m* of the channel circuit 210_1 of the source driver 200 may charge or discharge (i.e., output a gamma voltage to) a corresponding signal path among the signal paths SP_1 to SP_*m* of the output buffer circuit 214. When one of the DACs 212_1 to 212_*m* charges or discharges one of the signal paths SP_1 to SP_*m*, another corresponding signal path among the signal paths SP_1 to SP_*m* of the output buffer circuit 214 may provide a corresponding driving voltage (i.e., a driving signal) to the data line 31_1 of the display panel 30. A switching operation among the signal paths SP_1 to SP_*m* may facilitate increasing an operation frequency of the display panel.

Figure 3:
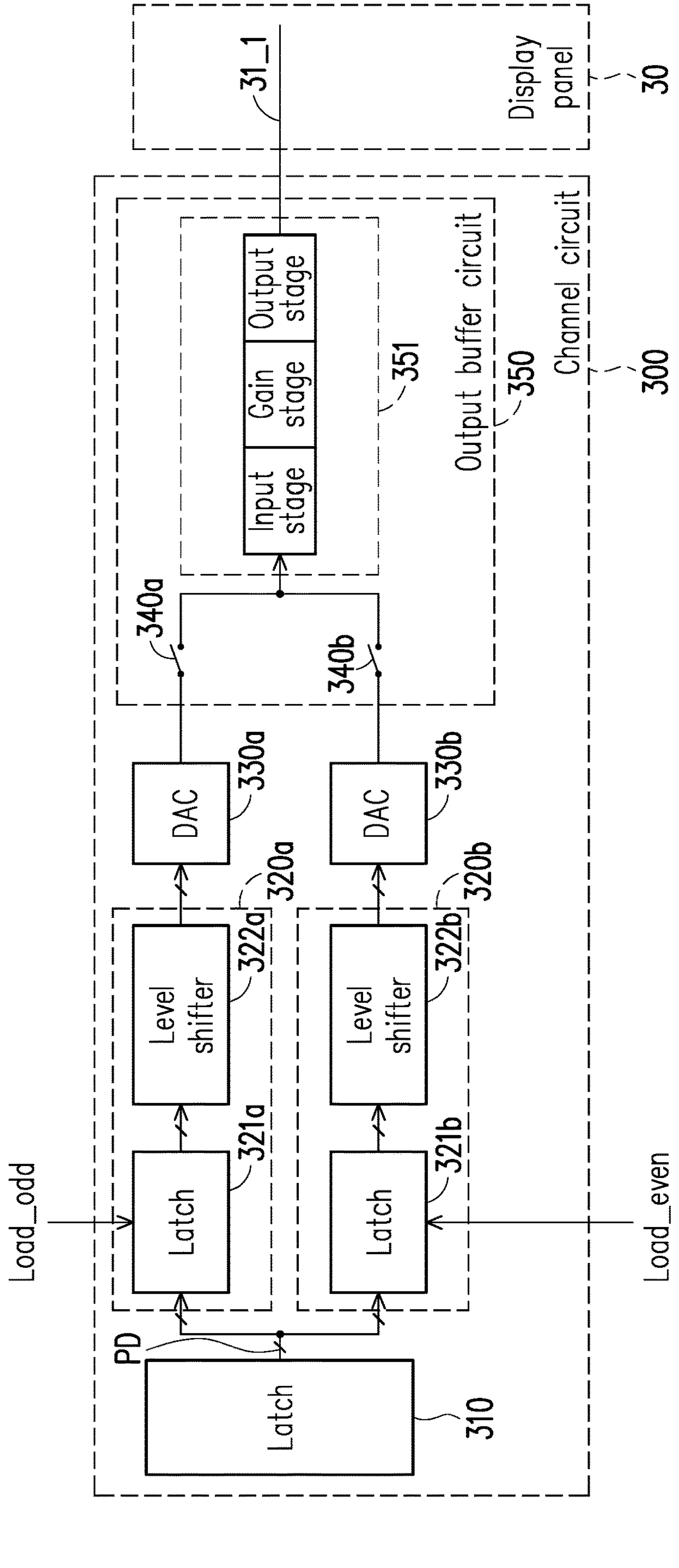
FIG. 3 is a schematic circuit block diagram illustrating a channel circuit according to an embodiment of the invention.

FIG. 3 is a schematic circuit block diagram illustrating a channel circuit 300 according to an embodiment of the invention. The channel circuit 300 illustrated in FIG. 3 may be inferred with reference to the description related to the channel circuit 210_1 illustrated in FIG. 2. In the embodiment illustrated in FIG. 3, the channel circuit 300 includes a latch 310, a data latch circuit 320*a*, a data latch circuit 320*b*, a DAC 330*a*, a DAC 330*b*, a switch 340*a*, a switch 340*b* and an output buffer circuit 350. The data latch circuit 320*a*, the DAC 330*a* and the switch 340*a* illustrated in FIG. 3 may be inferred with reference to the descriptions of the data latch circuit 211_1, the DAC 212_1 and the switch 213_1 illustrated in FIG. 2, the data latch circuit 320*b*, the DAC 330*b* and the switch 340*b* illustrated in FIG. 3 may be inferred with reference to the descriptions related to the data latch circuit 211_*m*, the DAC 212_*m* and the switch 213_*m* illustrated in FIG. 2, and the output buffer circuit 350 illustrated in FIG. 3 may be inferred with reference to the description related to the output buffer circuit 214 illustrated in FIG. 2.

An output terminal of the data latch circuit 320*a* is coupled to an input terminal of the DAC 330*a*, and an output terminal of the data latch circuit 320*b* is coupled to an input terminal of the DAC 330*b*. The data latch circuit 320*a* can be configured to load data according to a first loading signal (e.g. a loading signal Load_odd) indicating the first loading timing. The data latch circuit 320*b* can be configured to load data according to a second loading signal (e.g. a loading signal Load_even) indicating the second loading timing different from the first loading timing. As will be shown more clearly in FIG. 5, a pulse of each of the first and second loading signals (such as Load_odd and Load_even) can be generated every scan line period to cause the corresponding data latch circuit to load data. A time length of a latching period for each of the data latch circuits 320*a* and 320*b* (i.e., the time length between pulses of the first/second loading signal) can be multiple times (such as twice for m=2 in this case) a time length of one scan line period. After the first loading signal is generated to start a first latching period during which the data latch circuit 320*a* latches the pixel data in a first scan line (such as Line N), the second loading signal can be generated in the first latching period to start a second latching period during which the data latch circuit 320*b* latches the pixel data in a second scan line (such as Line N+1). Similarly to the description in connection to FIG. 2, a first switching timing for the switch 340*a* depends upon the first loading timing indicated by the first loading signal, and a second switching timing for the switch 340*b* depends upon the second loading timing indicated by the second loading signal.

In the embodiment illustrated in FIG. 3, the data latch circuit 320*a* includes a latch 321*a* and a level shifter 322*a*. An input terminal of the latch 321*a* is coupled to the latch 310 to receive a respective part of or all of bit data of pixel data PD. A control terminal of the latch 321*a* is controlled by a loading signal Load_odd. An input terminal of the level shifter 322*a* is coupled to the output terminal of the latch 321*a*. An output terminal of the level shifter 322*a* is coupled to an input terminal of the DAC 330*a*. The data latch circuit 320*b* includes a latch 321*b* and a level shifter 322*b*. The input terminal of the latch 321*b* is coupled to the latch 310 to receive the respective part of or all of the bit data of the pixel data PD. A control terminal of the latch 321*b* is controlled by a loading signal Load_even. An input terminal of the level shifter 322*b* is coupled to an output terminal of the latch 321*b*. An output terminal of the level shifter 322*b* is coupled to an input terminal of the DAC 330*b*.

According to a design requirement, in some embodiments, an input data range of the DAC 330*a* and an input data range of the DAC 330*b* may be the same, and an output voltage range of the DAC 330*a* and an output voltage range of the DAC 330*b* may be the same. A gamma circuit (not shown in FIG. 3) provides a first gamma voltage having a first level range and a second gamma voltage having a second level range respectively to the DAC 330*a* and the DAC 330*b*, wherein the first level range is the same as the second level range.

In one embodiment, when one of the DAC 330*a* and the DAC 330*b* is converting pixel data for a current scan line of a frame, the other one of the DAC 330*a* and the DAC 330*b* is converting pixel data for a next scan line of a frame. In this embodiment, the DAC 330*a* can be configured to convert a first plurality of scan lines (e.g. odd-numbered scan lines) of a frame; and the DAC 330*b* can be configured to convert a second plurality of scan lines (e.g. even-numbered scan lines) of the frame, wherein the first plurality of scan lines are different from the second plurality of scan lines. For example, during an even-numbered scan line period, the latch 321*b* may sample the respective part of or all of the bit data of the pixel data of an even-numbered scan line and output the sampled data to the DAC 330*b* through the level shifter 322*b*. During an odd-numbered scan line period, the latch 321*a* may sample the respective part of or all of the bit data of the pixel data of an odd-numbered scan line and output the sampled data to the DAC 330*a* through the level shifter 322*a*. Wherein, the odd-numbered scan line and the even-numbered scan line are adjacent lines. For example, the odd-numbered scan line is a $N^{th}$ line of a frame, and the even-numbered scan line is a $(N+1)^{th}$ line of the frame.

In the embodiment illustrated in FIG. 3, a first terminal of the switch 340*a* may serve as a first input terminal of the output buffer circuit 350, and a first terminal of the switch 340*b* may serve as a second input terminal of the output buffer circuit 350. The output buffer circuit 350 illustrated in FIG. 3 includes an output buffer 351. The implementation manner of the output buffer 351 is not limited in the present embodiment. For example, in some embodiments, the output buffer 351 may be a conventional output buffer or any other type of output buffer circuit. An input terminal of the output buffer 351 is coupled to a second terminal of the switch 340*a* and a second terminal of the switch 340*b*. An output terminal of the output buffer 351 may serve as an output terminal of the output buffer circuit 350. In such an implementation, the output buffer circuit 350 (which can include an input stage, a gain stage, and an output stage circuit) can be shared by the DACs 330*a* and 330*b*. One of the two output signals generated by the DACs 330*a* and 330*b* can reach the output buffer circuit 350 according to which of the switches 340*a* and 340*b* is turned on. In addition, the DACs 330*a* and 330*b* can be viewed as a DAC (e.g., a 8-bit DAC) divided into two groups, respectively converting data from latches 840*a* and 840*b* and output respective half ranges (e.g., 0-127 and 128-255 gamma voltage levels) of a whole range of a plurality of gamma voltage levels (e.g., 0-255 gamma voltage levels) output from a gamma voltage generation circuit (not shown).

During each first latching period (such as Line N, Line N+2), the data latch circuit 320*a* may latch and output the respective part of pixel data (e.g., odd-numbered scan lines) to the input terminal of the DAC 330*a*. Similarly, during each second latching period (such as Line N−1, Line N+1), the data latch circuit 320*b* may latch and output the respective part of pixel data (e.g., even-numbered scan lines) to the input terminal of the DAC 330*b*. Preferably, each second latching period can be stared during (such as in the middle of) a corresponding first latching period.

During a first period (e.g., an even-numbered scan line period), the switch 340*a* is turned on, and the switch 340*b* is turned off, such that the output buffer 351 may select to output a first driving signal related to a signal of the first input terminal of the output buffer circuit 350 to the data line 31_1 via the output terminal of the output buffer 351. Similarly, during a second time (e.g., an odd-numbered scan line period), the switch 340*a* is turned off, and the switch 340*b* is turned on, such that the output buffer 351 may select to output a second driving signal related to a signal of the second input terminal of the output buffer circuit 350 to the data line 31_1 via the output terminal of the output buffer 351. Preferably, each second period is next to a corresponding first period.

Figure 4:
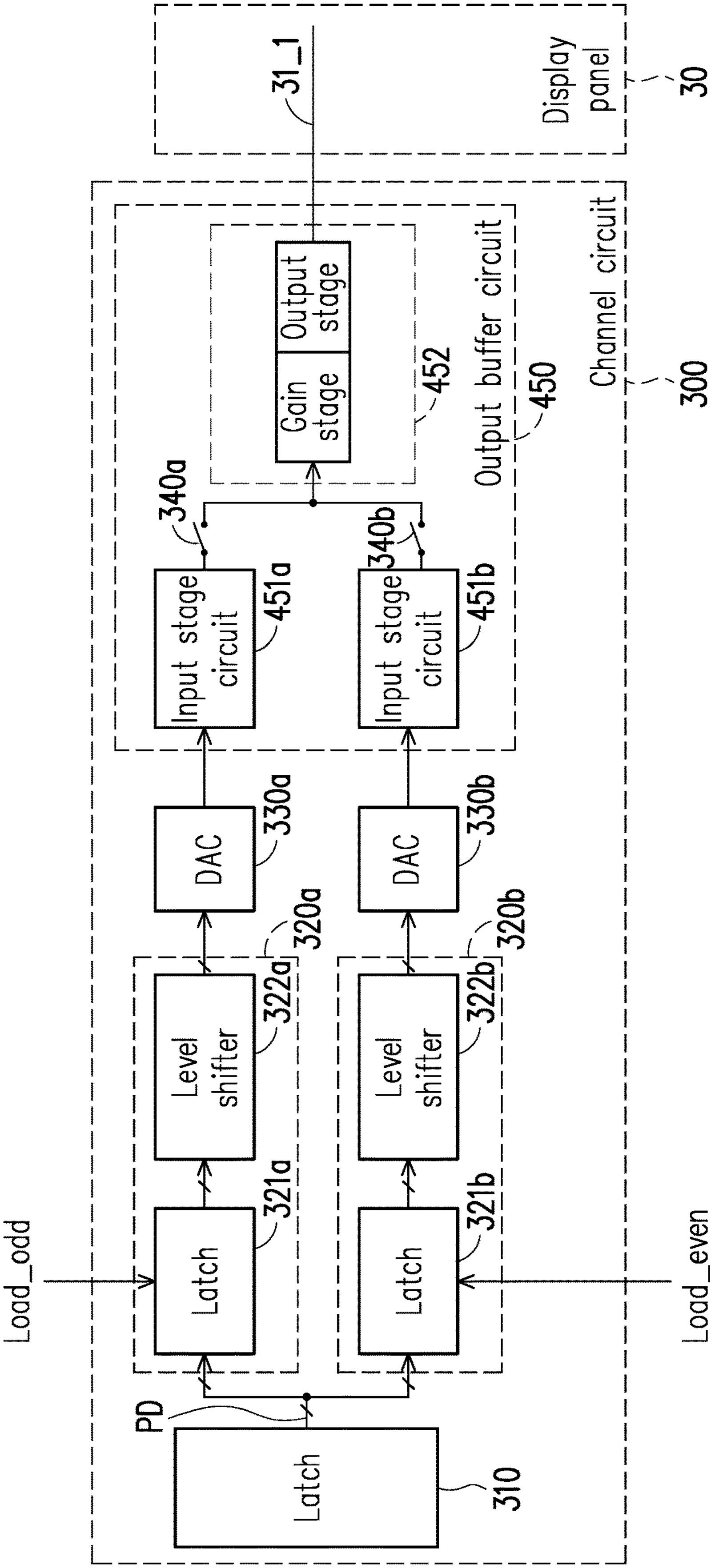
FIG. 4 is a schematic circuit block diagram illustrating a channel circuit according to another embodiment of the invention.

FIG. 4 is a schematic circuit block diagram illustrating a channel circuit 400 according to another embodiment of the invention. The channel circuit 400 illustrated in FIG. 4 may be inferred with reference to the description related to the channel circuit 210_1 illustrated in FIG. 2 or the channel circuit 300 illustrated in FIG. 3. In the embodiment illustrated in FIG. 4, the channel circuit 400 includes a latch 310, a data latch circuit 320*a*, a data latch circuit 320*b*, a DAC 330*a*, a DAC 330*b*, a switch 340*a*, a switch 340*b* and an output buffer circuit 450. The data latch circuit 320*a*, the DAC 330*a* and the switch 340*a* illustrated in FIG. 4 may be inferred with reference to the descriptions related to the data latch circuit 211_1, the DAC 212_1 and the switch 213_1 illustrated in FIG. 2 or with reference to the descriptions related to the data latch circuit 320*a*, the DAC 330*a* and the switch 340*a* illustrated in FIG. 3. The data latch circuit 320*b*, the DAC 330*b* and the switch 340*b* illustrated in FIG. 4 may be inferred with reference to the descriptions related to the data latch circuit 211_*m*, the DAC 212_*m* and the switch 213_*m* illustrated in FIG. 2 or with reference to the descriptions related to the data latch circuit 320*b*, the DAC 330*b* and the switch 340*b* illustrated in FIG. 3. The output buffer circuit 450 illustrated in FIG. 4 may be inferred with reference to the description related to the output buffer circuit 214 illustrated in FIG. 2 or with reference to the description related to the output buffer circuit 350 illustrated in FIG. 3.

In the embodiment illustrated in FIG. 4, the output buffer circuit 450 includes an input stage circuit 451*a*, an input stage circuit 451*b* and a gain and output stage circuit 452. The implementation manners of the input stage circuit 451*a*, the input stage circuit 451*b* and the gain and output stage circuit 452 are not limited in the present embodiment. For example, in some embodiments, the input stage circuit 451*a* and/or the input stage circuit 451*b* may include input stage circuits or other types of input stage circuits of a conventional amplifier, and the gain and output stage circuit 452 may include a gain stage circuit and an output stage circuit (or other types of gain and output stage circuits) of a conventional amplifier. An input terminal of the input stage circuit 451*a* may serve as a first input terminal of the output buffer circuit 450, and an input terminal of the input stage circuit 451*b* may serve as a second input terminal of the output buffer circuit 450. The first terminal of the switch 340*a* is coupled to an output terminal of the input stage circuit 451*a*. The first terminal of the switch 340*b* is coupled to an output terminal of the input stage circuit 451*b*. An input terminal of the gain and output stage circuit 452 is coupled to the second terminal of the switch 340*a* and the second terminal of the switch 340*b*. An output terminal of the gain and output stage circuit 452 may serve as an output terminal of the output buffer circuit 450.

In such an implementation, the gain and output stage circuit 452 can be shared by the input stage circuits 451*a* and 451*b*. One of the two output signals generated by the input stage circuits 451*a* and 451*b* can reach the gain and output stage circuit 452 according to which of the switches 340*a* and 340*b* is turned on. In addition, the DACs 330*a* and 330*b* can be viewed as a DAC (e.g., a 8-bit DAC) divided into two groups, respectively converting data from latches 840*a* and 840*b* and output respective half ranges (e.g., 0-127 and 128-255 gamma voltage levels) of a whole range of a plurality of gamma voltage levels (e.g., 0-255 gamma voltage levels) output from a gamma voltage generation circuit (not shown).

Figure 5:
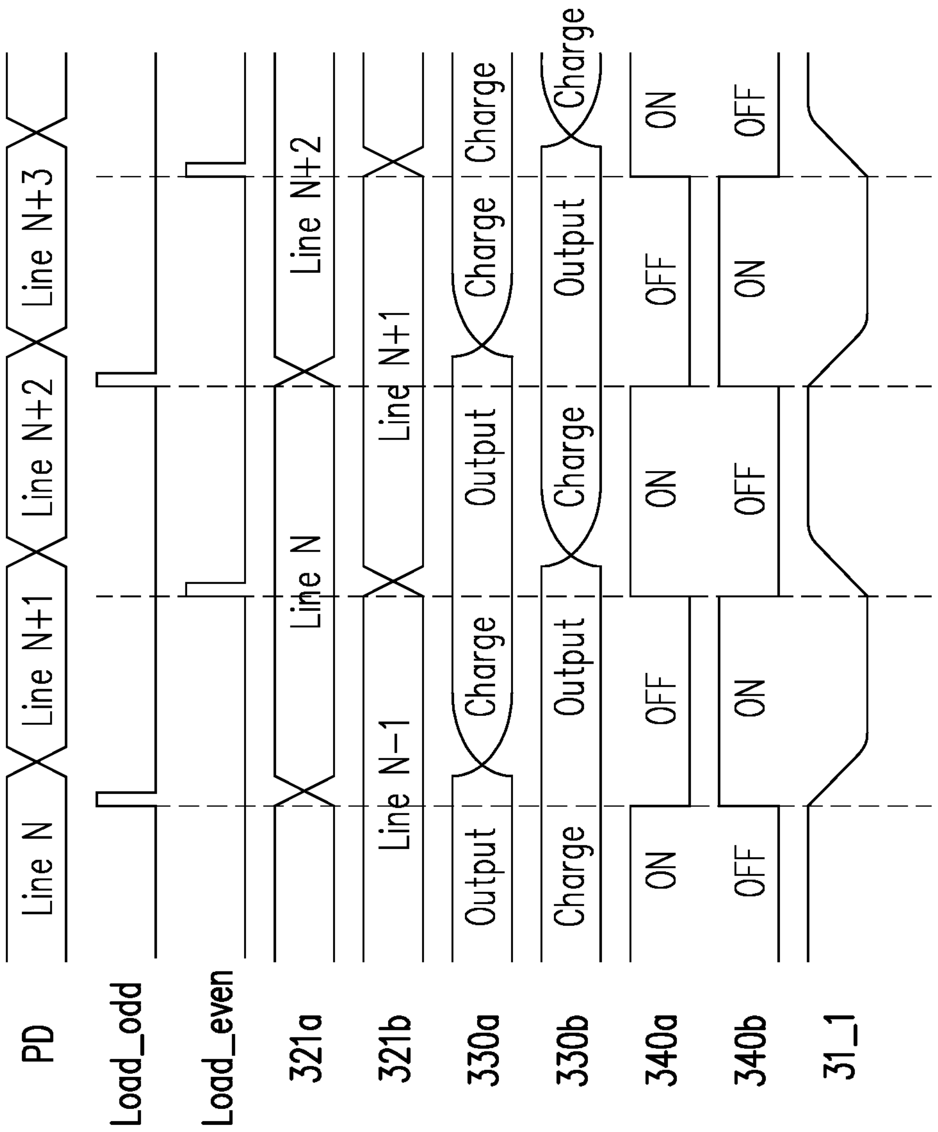
FIG. 5 is a schematic signal timing diagram of the circuit depicted in FIG. 4 according to an embodiment of the invention.

FIG. 5 is a schematic signal timing diagram of the circuit depicted in FIG. 3 or FIG. 4 according to an embodiment of the invention. For descriptive convenience, the first period of the invention may be defined as an even-numbered scan line period, and the second period of the invention may be defined as an odd-numbered scan line period. Taking the embodiment illustrated in FIG. 5 for example, the odd-numbered scan line periods may include an $N^{th}$ scan line period (which is labeled as "Line N") and an $(N+2)^{th}$ scan line period (which is labeled as "Line N+2"), the even-numbered scan line periods may include an $(N+1)^{th}$ scan line period (which is labeled as "Line N+1") and an $(N+3)^{th}$ scan line period (which is labeled as "Line N+3"). In other embodiments, the first period of the invention may be defined as an odd-numbered scan line period, and the second period of the invention may be defined as an even-numbered scan line period.

Referring to FIG. 4 and FIG. 5, a pulse of each of the first and second loading signals (such as Load_odd and Load_even) can be generated every scan line period to cause the corresponding data latch circuit to load data. Everytime an odd-numbered line period (such as Line N, Line N+2) of a data signal PD is almost ended, a pulse of a first load signal Load_odd is generated, triggering the latch 321*a* in the data latch circuit 320*a* to latch respective part of pixel data. Similarly, everytime an even-numbered line period (such as Line N+1, Line N+3) of the data signal PD is almost ended, a pulse of a second load signal Load_even is generated, triggering the latch 321*b* in the data latch circuit 320*b* to latch respective part of pixel data. As can be seen clearly in FIG. 5, a time length of a latching period for each of the data latch circuits 320*a* and 320*b* (i.e., the time length between pulses of the first/second loading signal) can be twice a time length of one scan line period.

After the first loading signal Load_odd is generated to start a first latching period during which the latch 321*a* in the data latch circuit 320*a* latches the pixel data of the first scan line (such as Line N), the second loading signal Load_even can be generated in the first latching period, for example, in the half point of the first latching period to start a second latching period during which the latch 321*b* in the data latch circuit 320*b* latches the pixel data of the second scan line (such as Line N+1).

After the first latching period is started, i.e., after the respective part of pixel data (such as pixel data of Line N) is latched by the latch 321*a* of the data latch circuit 320*a*, the first DAC 330*a* converts (charges) the respective part of the latched pixel data, so as to output a converted result (a gamma voltage) to the input terminal of the input stage circuit 451*a* during the first latching period. In the first period, the switch 340*a* may be turned on (which is labeled as "ON"), and the switch 340*b* may turned off (which is labeled as "OFF"), such that the output buffer circuit 350 or 450 may select to output a first driving signal to the data line 31_1 according to the gamma voltage generated by the first DAC 330*a*. Similarly, after the second latching period is started, i.e., after the respective part of pixel data (such as pixel data of Line N+1) is latched by the latch 321*b* of the data latch circuit 320*b*, the second DAC 330*b* converts (charges) the respective part of the latched pixel data, so as to output a converted result (a gamma voltage) to the input terminal of the input stage circuit 451*b* during the second latching period. In the second period, the switch 340*b* may be turned on (which is labeled as "ON"), and the switch 340*a* may turned off (which is labeled as "OFF"), such that the output buffer circuit 350 or 450 may select to output a second driving signal to the data line 31_1 according to the gamma voltage generated by the second DAC 330*b*.

It is noted that, during the time when DAC 330*a* is still charging the input terminal of the input stage circuit, the DAC 330*b* may start to pre-charge input terminal of the input stage circuit.

Figure 6:
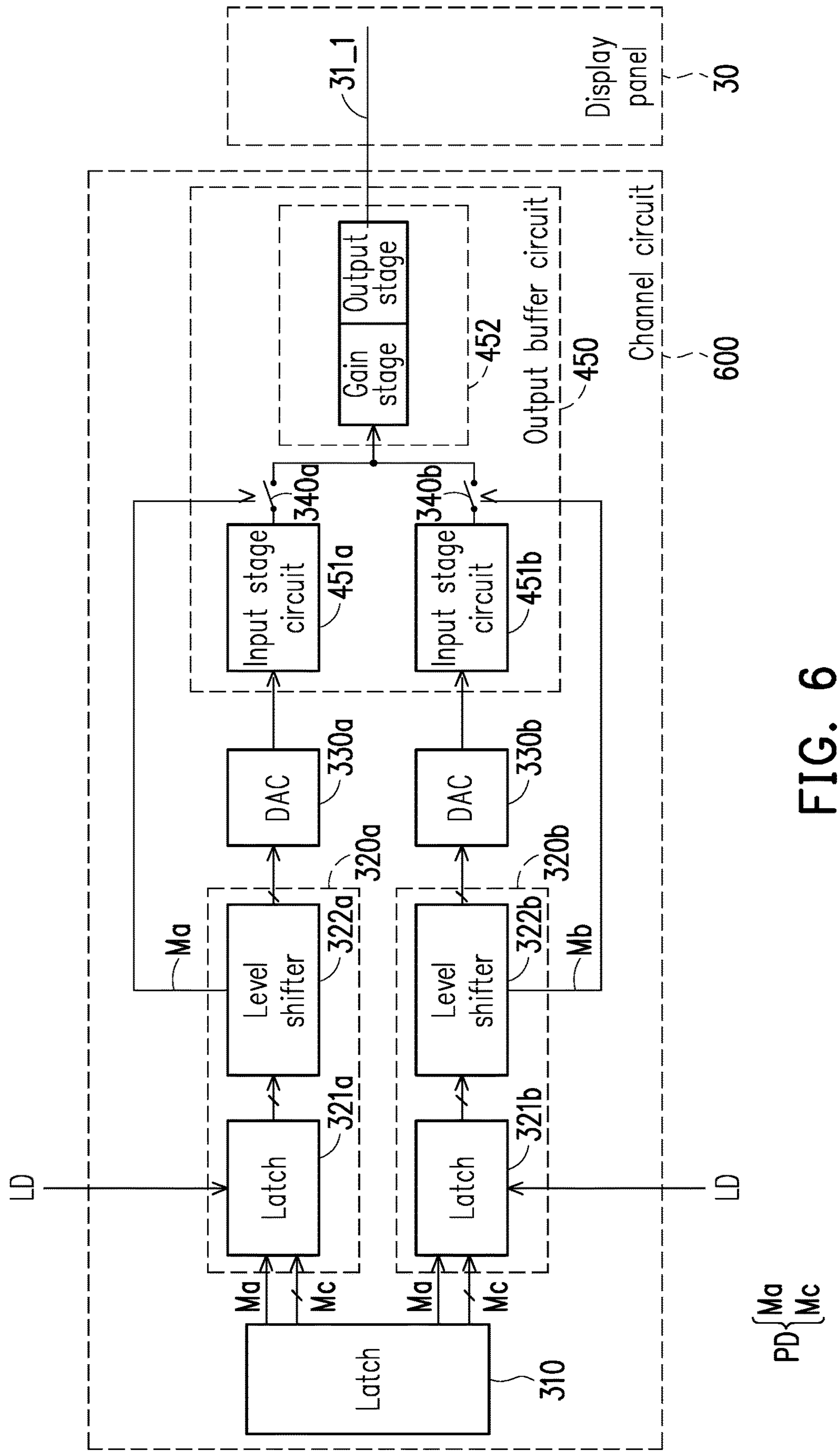
FIG. 6 is a schematic circuit block diagram illustrating a channel circuit according to yet another embodiment of the invention.

FIG. 6 is a schematic circuit block diagram illustrating a channel circuit 600 according to yet another embodiment of the invention. The channel circuit 600 illustrated in FIG. 6 includes a latch 310, a data latch circuit 320*a*, a data latch circuit 320*b*, a DAC 330*a*, a DAC 330*b*, a switch 340*a*, a switch 340*b* and an output buffer circuit 450. The channel circuit 600, the latch 310, the data latch circuit 320*a*, the data latch circuit 320*b*, the DAC 330*a*, the DAC 330*b*, the switch 340*a*, the switch 340*b* and the output buffer circuit 450 illustrated in FIG. 6 may be inferred with reference to the descriptions related to the channel circuit 400, the latch 310, the data latch circuit 320*a*, the data latch circuit 320*b*, the DAC 330*a*, the DAC 330*b*, the switch 340*a*, the switch 340*b* and the output buffer circuit 450 illustrated in FIG. 4 and thus, will not be repeated. Similar to FIG. 4, in such an implementation, the gain and output stage circuit 452 can be shared by the input stage circuits 451*a* and 451*b*. One of the two output signals generated by the input stage circuits 451*a* and 451*b* can reach the gain and output stage circuit 452 according to which of the switches 340*a* and 340*b* is turned on. In addition, the DACs 330*a* and 330*b* can be viewed as a DAC (e.g., a 8-bit DAC) divided into two groups, respectively converting data from latches 321*a* and 321*b* and output respective half ranges (e.g., 0-127 and 128-255 gamma voltage levels) of a whole range of a plurality of gamma voltage levels (e.g., 0-255 gamma voltage levels) output from a gamma voltage generation circuit (not shown).

In the embodiment illustrated in FIG. 6, for each value of the pixel data, which one of the DAC 330*a* and the DAC 330*b* converts the pixel data depends upon the value of the pixel data. For example, for each value of pixel data, one of the DAC 330*a* and the DAC 330*b* operates to convert the pixel data, and the other one of the DAC 330*a* and the DAC 330*b* does not convert the pixel data. The data latch circuit

320*a* is configured to load data according to a first loading timing depending upon a first switching timing of the switch 340*a*. The data latch circuit 320*b* is configured to load data according to a second loading timing depending upon a second switching timing of the switch 340*b*.

In the embodiment illustrated in FIG. 6, a value range of the pixel data PD may be divided into a plurality of sub-ranges. The sub-ranges include a first sub-range and a second sub-range. An output voltage range of the DAC 330*a* is different from an output voltage range of the DAC 330*b*, the output voltage range of the DAC 330*a* is related to the first sub-range of the pixel data PD, and the output voltage range of the DAC 330*b* is related to the second sub-range of the pixel data PD. A gamma circuit (not shown in FIG. 6) provides a first gamma voltage having a first level range and a second gamma voltage having a second level range respectively to the DAC 330*a* and the DAC 330*b*, wherein the first level range is different from the second level range. The first sub-range and the second sub-range are a high range and a lower range of the value range of the pixel data, respectively. The first sub-range and the second sub-range are not overlapped with each other. When a value of pixel data falls within the first sub-range, the DAC 330*a* operates to convert the pixel data. When the value of pixel data does not fall within the first sub-range, the DAC 330*a* does not convert the pixel data. When the value of pixel data falls within the second sub-range, the DAC 330*b* operates to convert the pixel data. When the value of pixel data does not fall within the second sub-range, the DAC 330*b* does not convert the pixel data.

When the pixel data PD belongs to the first sub-range, the data latch circuit 320*a* may latch and output a first respective part of bit data of the pixel data PD to the input terminal of the DAC 330*a*, and the output buffer circuit 450 may select to output a first driving signal related to a signal of the first input terminal of the output buffer circuit 450 via the output terminal of the output buffer circuit 450. When the pixel data PD belongs to the second sub-range, the data latch circuit 320*b* may latch and output the first respective part of bit data of the pixel data PD to the input terminal of the DAC 330*b*, and the output buffer circuit 450 may select to output a second driving signal related to a signal of the second input terminal of the output buffer circuit 450 via the output terminal of the output buffer circuit 450.

In the embodiment illustrated in FIG. 6, the first control terminal of the latch 321*a* and the first control terminal of the latch 321*b* are both controlled by a same loading signal LD. The input terminal of the latch 321*a* and an input terminal of the latch 321*b* are both coupled to the latch 310. The input terminal of the latch 321*a* and the input terminal of the latch 321*b* may receive the first respective part of bit data of the pixel data PD. The second control terminal of the latch 321*a* and the second control terminal of the latch 321*b* may receive the second respective part of bit data of the pixel data PD (i.e. at least one bit of the pixel data PD). The latch 321*a* is configured to load data according to the second respective part of the pixel data PD and a loading signal LD. The latch 321*b* is configured to load data according to the second respective part of the pixel data PD and the loading signal. A time length of a loading period for the loading signal LD is equal to a time length of a line latching period for each of the latch 321*a* and the latch 321*b*. When the pixel data PD belongs to the first sub-range, and the loading signal LD is enabled, the latch 321*a* may latch and output the first respective part of bit data of the pixel data PD. When the pixel data PD belongs to the second sub-range, and the loading signal LD is enabled, the latch 321*b* may latch and output the first respective part of bit data of the pixel data PD.

A first switching timing for the switch 340*a* depends upon the at least one bit of the pixel data, and a second switching timing for the switch 340*b* depends upon depends upon the at least one bit of the pixel data. For example, the pixel data PD includes a most significant bit (MSB) and other bits (for example, the first respective part of bit data). The other bits include a least significant bit (LSB). The level shifter 322*a* may transmit the pixel data latched by the latch 321*a* to the DAC 330*a*, and the level shifter 322*b* may transmit the pixel data latched by the latch 321*b* to the DAC 330*b*. In addition, the level shifter 322*a* may transmit an MSB Ma of the pixel data to a control terminal of the switch 340*a*, and the level shifter 322*b* may transmit an inverted bit Mb of the MSB Ma of the pixel data to a control terminal of the switch 340*b*.

In such an implementation, each of the two latches 321*a* and 321*b* can be controlled by a loading signal LD and at least one bit (e.g., MSB data) of the data (e.g., 8 bits data) output from the latch 310. The other bits (e.g. 7 bits data) of the data output from the latch 310 can be provided to one of the latches 321*a* and 321*b*, according to the at least one bit (e.g., MSB data). For example, when the value of MSB is “1”, the latch 321*b* latches the 7 bits of the 8 bits data output from the latch 310 then provides the latched data to the corresponding DAC 330*a*; and conversely, when the value of MSB is “0”, the latch 321*a* latches the 7 bits of the 8 bits data output from the latch 310 and then provides the latched data to the corresponding DAC 330*a*. Accordingly, when the MSB remains unchanged, only one of the DACs is operating to output a respective sub-range of a whole range of gamma voltage levels output from the gamma voltage generation circuit and the other one of the DACs remains idle (i.e., not converting the pixel data), and when the MSB changes, the operating DAC and the idle DAC change to be the idle DAC and the operating DAC respectively.

Figure 7:
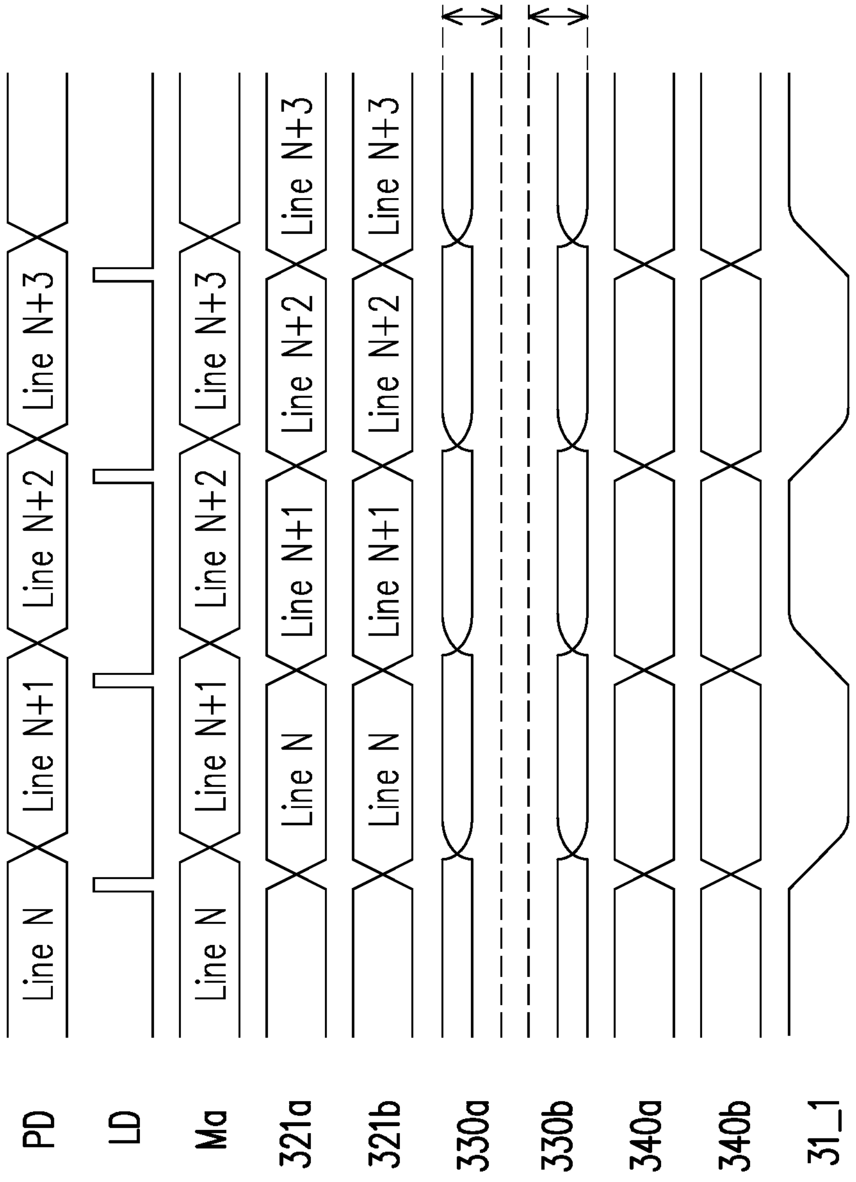
FIG. 7 is a schematic signal timing diagram of the circuit depicted in FIG. 6 according to an embodiment of the invention.

FIG. 7 is a schematic signal timing diagram of the circuit depicted in FIG. 6 according to an embodiment of the invention. The embodiment illustrated in FIG. 7 may be inferred with reference to the description related to the embodiment illustrated in FIG. 5. According to waveforms illustrated in FIG. 7, the output voltage range of the DAC 330*a* is different from the output voltage range of the DAC 330*b*. When the MSB Ma has data of logic “1” (i.e., the inverted bit Mb has data of logic “0”), i.e., when the pixel data PD belongs to the first sub-range, the data latch circuit 320*a* may latch and output the first respective part of bit data of the pixel data PD to the input terminal of the DAC 330*a*, and the DAC 330*a* may output a corresponding gamma voltage to the input terminal of the input stage circuit 451*a*, while the DAC 330*b* does not convert the pixel data and does not output a corresponding gamma voltage. When the MSB Ma has data of logic “1” (i.e., the inverted bit Mb has data of logic “0”), the switch 340*a* is turned on, and the switch 340*b* is turned off, such that the gain and output stage circuit 452 may select to output a first driving signal related to a signal of the input terminal of the input stage circuit 451*a* to the data line 31_1.

When the MSB Ma has data of logic “0” (i.e., the inverted bit Mb has data of logic “1”), i.e., when the pixel data PD belongs to the second sub-range, the data latch circuit 320*b* may latch and output the first respective part of bit data of the pixel data PD to the input terminal of the DAC 330*b*, and the DAC 330*b* may output a corresponding gamma voltage to the input terminal of the input stage circuit 451*b*, while the DAC 330*a* does not convert the pixel data and does not output a corresponding gamma voltage. When the MSB Ma has data of logic "0" (i.e., the inverted bit Mb has data of logic "1"), the switch 340*a* is turned off, and the switch 340*b* is turned on, such that the gain and output stage circuit 452 may select to output a second driving signal related to a signal of the input terminal of the input stage circuit 451*b* to the data line 31_1.

Figure 8:
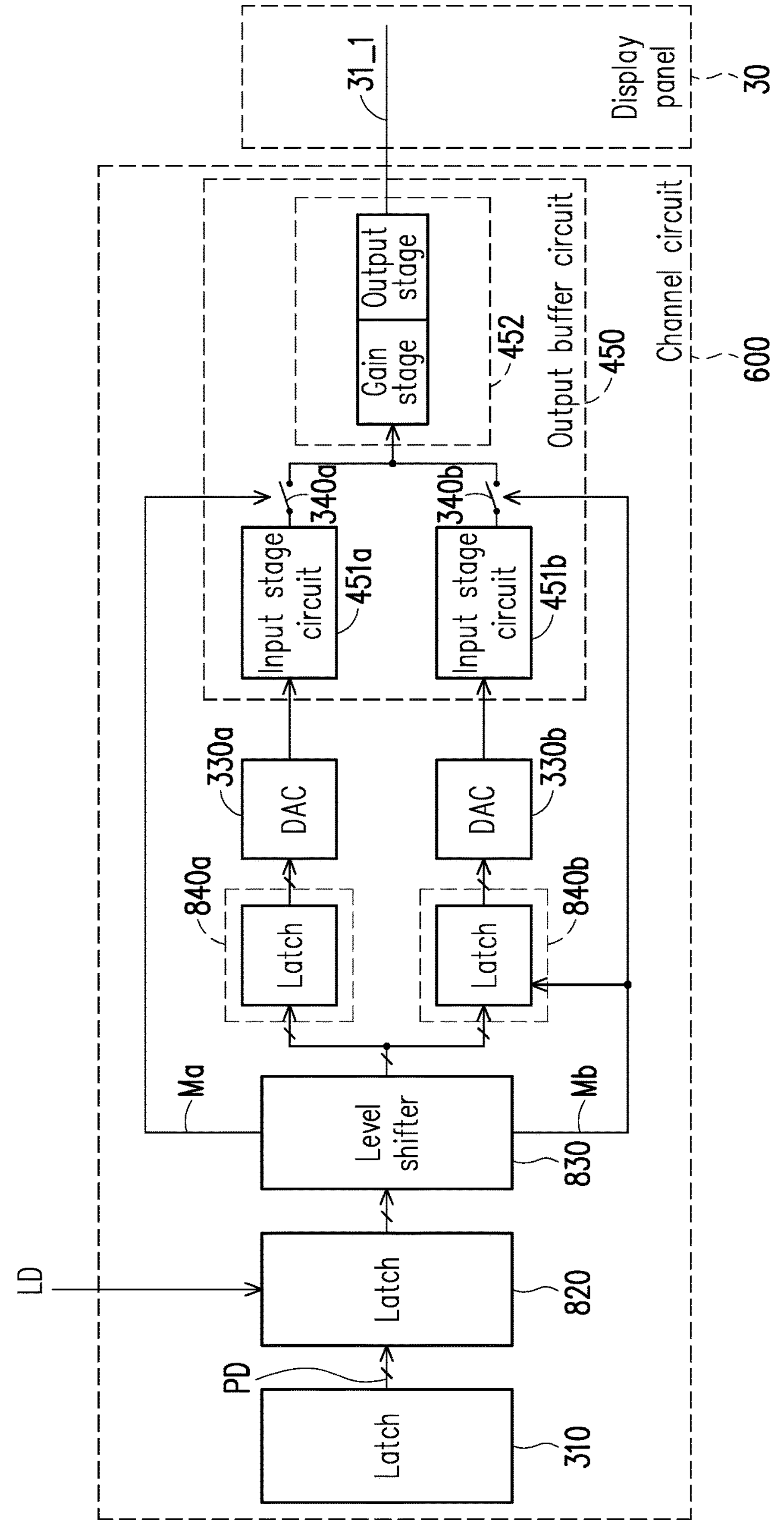
FIG. 8 is a schematic circuit block diagram illustrating a channel circuit according to yet another embodiment of the invention.

FIG. 8 is a schematic circuit block diagram illustrating a channel circuit 800 according to yet another embodiment of the invention. The channel circuit 800 illustrated in FIG. 8 includes a latch 310, a latch 820, a level shifter 830, a data latch circuit 840*a*, a data latch circuit 840*b*, a DAC 330*a*, a DAC 330*b*, a switch 340*a*, a switch 340*b* and an output buffer circuit 450. The channel circuit 800, the latch 310, the DAC 330*a*, the DAC 330*b*, the switch 340*a*, the switch 340*b* and the output buffer circuit 450 illustrated in FIG. 8 may be inferred with reference to the descriptions related to the channel circuit 600, the latch 310, the DAC 330*a*, the DAC 330*b*, the switch 340*a*, the switch 340*b* and the output buffer circuit 450 illustrated in FIG. 6 and thus, will not be repeated. The latch 820 illustrated in FIG. 8 may be inferred with reference to the descriptions related to the latch 321*a* and the latch 321*b* illustrated in FIG. 6, and the level shifter 830 illustrated in FIG. 8 may be inferred with reference to the descriptions related to the level shifter 322*a* and the level shifter 322*b* illustrated in FIG. 6. The main difference between FIG. 6 and FIG. 8 is that the level shifter 830 is shared by the latch 820 in FIG. 8. The data latch circuit 840*a* and the data latch circuit 840*b* illustrated in FIG. 8 may be inferred with reference to the descriptions related to the data latch circuit 211_1 and the data latch circuit 211_*m* illustrated in FIG. 2. Similar to FIG. 6, in such an implementation, the gain and output stage circuit 452 can be shared by the input stage circuits 451*a* and 451*b*. One of the two output signals generated by the input stage circuits 451*a* and 451*b* can reach the gain and output stage circuit 452 according to which of the switches 340*a* and 340*b* is turned on. In addition, the DACs 330*a* and 330*b* can be viewed as a DAC (e.g., a 8-bit DAC) divided into two groups, respectively converting data from latches 840*a* and 840*b* and output respective half ranges (e.g., 0-127 and 128-255 gamma voltage levels) of a whole range of a plurality of gamma voltage levels (e.g., 0-255 gamma voltage levels) output from a gamma voltage generation circuit (not shown).

In the embodiment illustrated in FIG. 8, the data latch circuit 840*a* and the data latch circuit 840*b* receive a first respective part of bit data of pixel data from the level shifter 830. An output terminal of the data latch circuit 840*a* is coupled to the input terminal of the DAC 330*a*. An output terminal of the data latch circuit 840*b* is coupled to the input terminal of the DAC 330*b*.

In an example, the level shifter 830 outputs 8-bits data, at least one bit (e.g., MSB and $\overline{\text{MSB}}$, served as the bits Ma and Mb, respectively) provided to the switches 340*a* and 340*b*, respectively and 7 bits LSB data provided to each of the latches 840*b* and 840*b*.

More specifically, when the MSB Ma has data of logic "1" (i.e., the inverted bit Mb has data of logic "0"), i.e., when the pixel data PD belongs to the first sub-range, the data latch circuit 840*a* may latch and output the first respective part of bit data of the pixel data to the input terminal of the DAC 330*a*, and the DAC 330*a* may output a corresponding gamma voltage to the input terminal of the input stage circuit 451*a*. When the MSB Ma has data of logic "1" (i.e., the inverted bit Mb has data of logic "0"), the switch 340*a* is turned on, and the switch 340*b* is turned off, such that the gain and output stage circuit 452 may select to output a first driving signal related to a signal of the input terminal of the input stage circuit 451*a* to the data line 31_1.

When the MSB Ma has data of logic "0" (i.e., the inverted bit Mb has data of logic "1"), i.e., when the pixel data PD belongs to the second sub-range, the data latch circuit 840*b* may latch and output the first respective part of bit data of the pixel data to the input terminal of the DAC 330*b*, and the DAC 330*b* may output a corresponding gamma voltage to the input terminal of the input stage circuit 451*b*. When the MSB Ma has data of logic "0" (i.e., the inverted bit Mb has data of logic "1"), the switch 340*a* is turned off, and the switch 340*b* is turned on, such that the gain and output stage circuit 452 may select to output a second driving signal related to the signal of the input terminal of the input stage circuit 451*b* to the data line 31_1.

In the embodiment described above, the value range of the pixel data PD may be divided into the first sub-range and the second sub-range according to the MSB of the pixel data PD. In any way, the manner of dividing the value range of the pixel data PD should not be limited to that of the embodiment described above. The manner of dividing the value range of the pixel data PD may be determined according to a design requirement.

Figure 9:
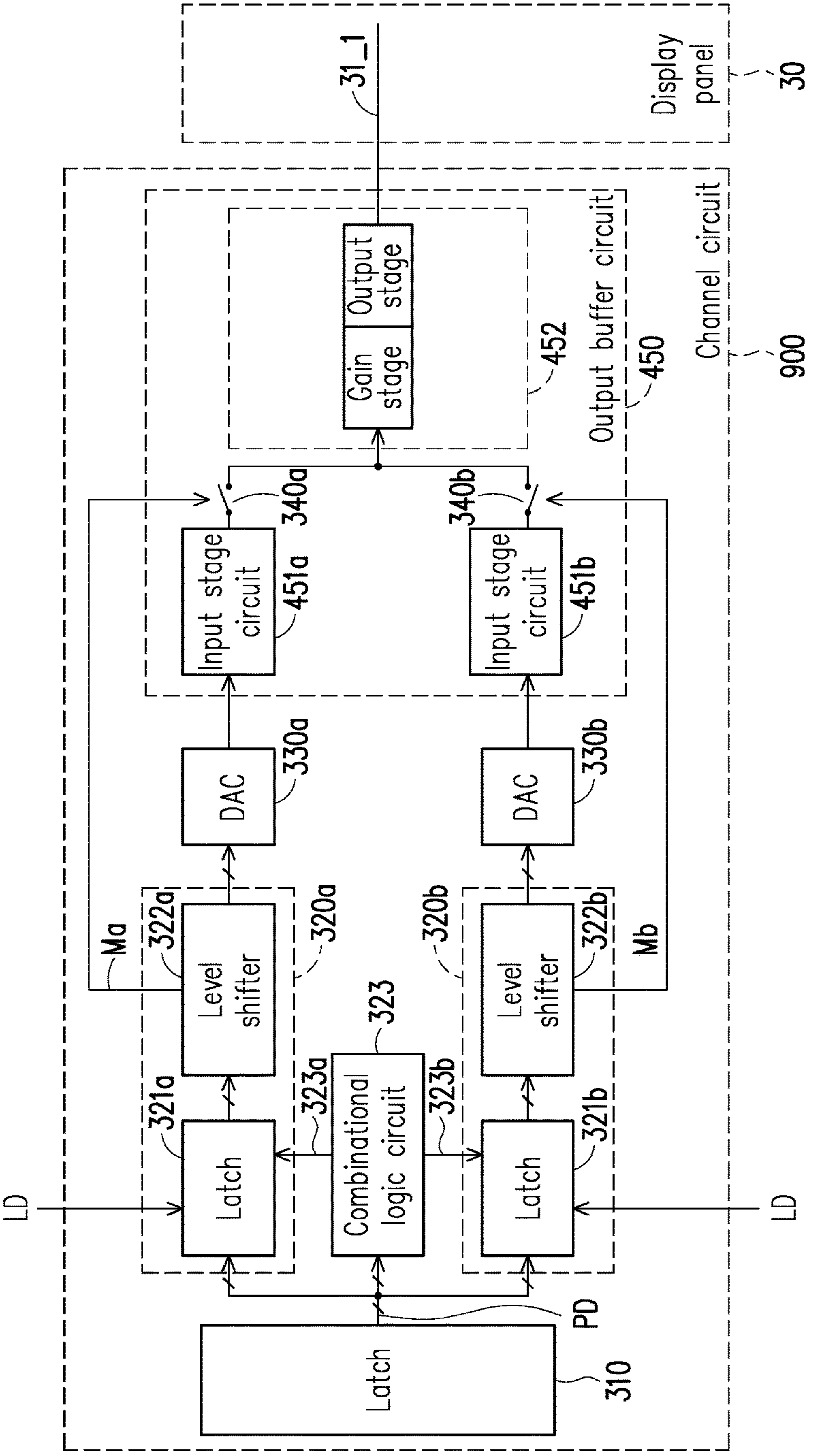
FIG. 9 is a schematic circuit block diagram illustrating a channel circuit according to still another embodiment of the invention.

FIG. 9 is a schematic circuit block diagram illustrating a channel circuit 900 according to still another embodiment of the invention. The channel circuit 900 illustrated in FIG. 9 includes a latch 310, a data latch circuit 320*a*, a data latch circuit 320*b*, a DAC 330*a*, a DAC 330*b*, a switch 340*a*, a switch 340*b* and an output buffer circuit 450. The channel circuit 900, the latch 310, the data latch circuit 320*a*, the data latch circuit 320*b*, the DAC 330*a*, the DAC 330*b*, the switch 340*a*, the switch 340*b* and the output buffer circuit 450 may be inferred with reference to the descriptions related to the channel circuit 600, the latch 310, the DAC 330*a*, the DAC 330*b*, the switch 340*a*, the switch 340*b* and the output buffer circuit 450 illustrated in FIG. 6 and thus, will not be repeated. In such an implementation, the gain and output stage circuit 452 can be shared by the input stage circuits 451*a* and 451*b*. One of the two output signals generated by the input stage circuits 451*a* and 451*b* can reach the gain and output stage circuit 452 according to which of the switches 340*a* and 340*b* is turned on.

In the embodiment illustrated in FIG. 9, the data latch circuit 320*a* includes a latch 321*a*, a level shifter 322*a* and a combinational logic circuit 323, and the data latch circuit 320*b* includes a latch 321*b* and a level shifter 322*b*. A plurality of gamma voltage levels are provided by a gamma voltage generation circuit (not shown), divided into two groups and provided to the DAC 330*a* and DAC 330*b*, respectively. The combinational logic circuit 320 can determine how to allocate the data latched by the latch 310 to the latches 321*a* and 321*b* and then converted by the DAC 330*a* and 30*b*, respectively.

In a specific example, the combinational logic circuit 323 may determine whether the pixel data PD belongs to the first sub-range or to the second sub-range. The first sub-range and the second sub-range may be defined according to a design requirement. When the pixel data PD belongs to the first sub-range, the combinational logic circuit 323 may output a determination result 323*a* to the latch 321*a*. When the pixel data PD belongs to the second sub-range, the combinational logic circuit 323 may output a determination result 323*b* to the latch 321*b*.

The input terminal of the latch 321*a* is configured to receive the first respective part of bit data of the pixel data PD. When the determination result 323*a* indicates that the pixel data PD belongs to the first sub-range, and the loading signal LD is enabled, the latch 321_a_ may latch and output the first respective part of bit data of the pixel data PD. The input terminal of the level shifter 322_a_ is coupled to the first output terminal of the latch 321_a_. The output terminal of the level shifter 322_a_ is coupled to the input terminal of the DAC 330_a_. The input terminal of the latch 321_b_ is configured to receive the first respective part of bit data of the pixel data PD. When the determination result 323_b_ indicates that the pixel data PD belongs to the second sub-range, and the loading signal LD is enabled, the second latch 321_b_ may latch and output the first respective part of bit data of the pixel data PD. The input terminal of the level shifter 322_b_ is coupled to the output terminal of the latch 321_b_. The output terminal of the level shifter 322_b_ is coupled to the input terminal of the DAC 330_b_.

When the pixel data PD belongs to the first sub-range, the latch 321_a_ may latch and output the pixel data PD, and thus, the DAC 330_a_ may output a corresponding gamma voltage to the input terminal of the input stage circuit 451_a_. When the MSB Ma has data of logic "1" (i.e., the inverted bit Mb has data of logic "0"), the switch 340_a_ is turned on, and the switch 340_b_ is turned off, such that the gain and output stage circuit 452 may select to output a first driving signal related to a signal of the input terminal of the input stage circuit 451_a_ to the data line 31_1.

When the pixel data PD belongs to the second sub-range, the latch 321_b_ may latch and output the pixel data PD, and thus, the DAC 330_b_ may output a corresponding gamma voltage to the input terminal of the input stage circuit 451_b_. When the MSB Ma has data of logic "0" (i.e., the inverted bit Mb has data of logic "1"), the switch 340_a_ is turned off, and the switch 340_b_ is turned on, such that the gain and output stage circuit 452 may select to output a second driving signal related to a signal of the input terminal of the input stage circuit 451_b_ to the data line 31_1.

For example, the latch 310 can latch 8 bits of data. At least one bit of the 8 bits data (e.g., 8 bits) output from the latch 310 can be provided to the combinational logic circuit 323 and the 8 bits data output from the latch 310 can be also provided to each of the latches 321_a_ and 321_b_. In addition, the combinational logic circuit 323 can provide at least one bit of data (e.g., 1 bit) to each of the latches 321_a_ and 321_b_. Accordingly, each of the latches 321_a_ and 321_b_ can latch 9 bits of data (one bit from the combinational logic circuit 323 and the other 8 bits from the latch 310) and can then can be responsible for latching a respective sub-range of a whole range of the data output by the latch 310 according to the one bit from the combinational logic circuit 323. At least one bit (such as one MSB bit) output from each of the latches 321_a_ and 321_b_ can be provided to a corresponding one of the switches 340_a_ and 340_b_, and 7 bits output from each of the latches 321_a_ and 321_b_ can be provided to a corresponding one of the DACs 330_a_ and 330_b_.

Figure 10:
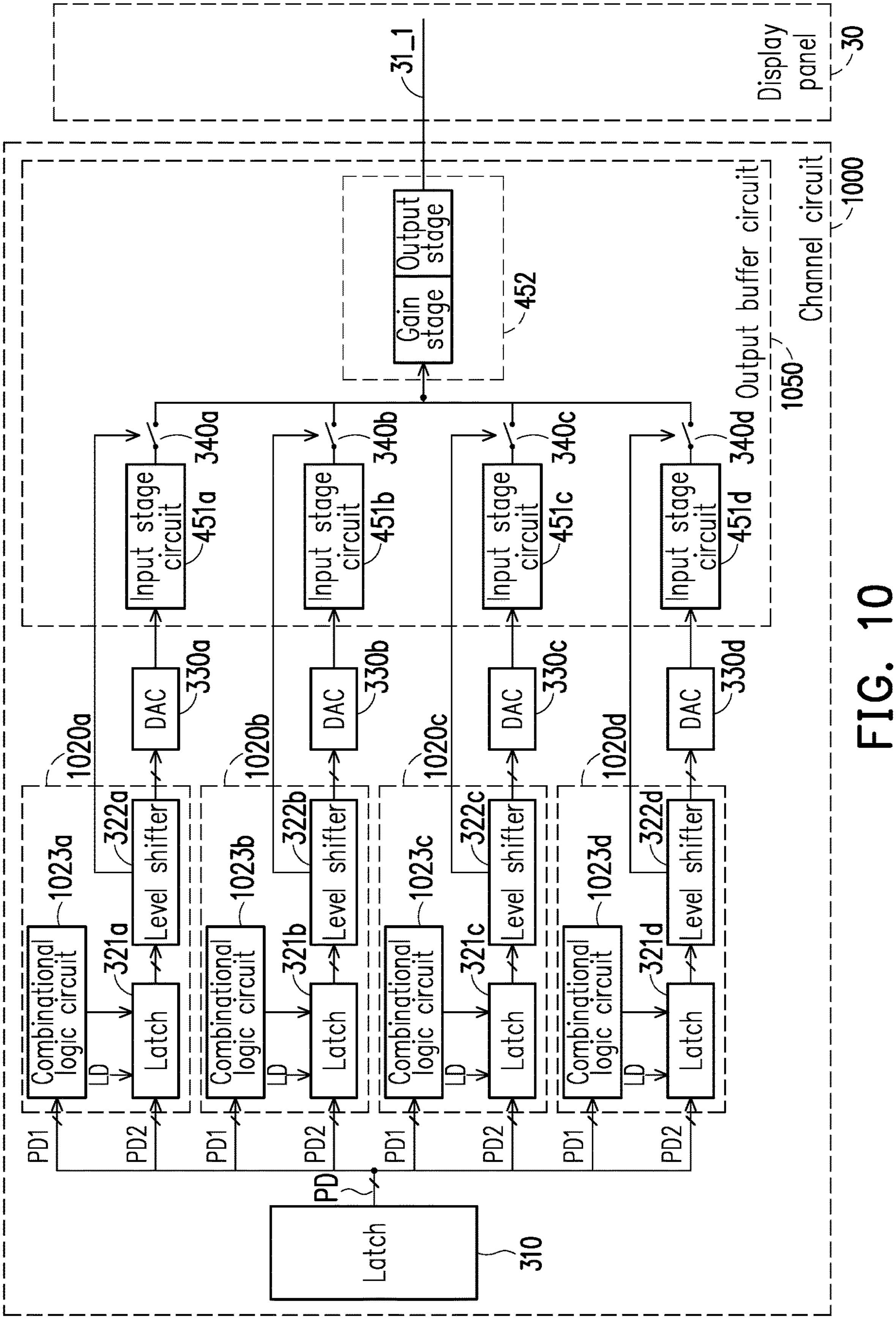
FIG. 10 is a schematic circuit block diagram illustrating a channel circuit according to further another embodiment of the invention.

FIG. 10 is a schematic circuit block diagram illustrating a channel circuit 1000 according to further another embodiment of the invention. The channel circuit 1000 illustrated in FIG. 10 includes a latch 310, a data latch circuit 1020_a_, a data latch circuit 1020_b_, a data latch circuit 1020_c_, a data latch circuit 1020_d_, a DAC 330_a_, a DAC 330_b_, a DAC 330_c_, a DAC 330_d_, a switch 340_a_, a switch 340_b_, a switch 340_c_, a switch 340_d_ and an output buffer circuit 1050. The channel circuit 1000, the latch 310 and the output buffer circuit 1050 illustrated in FIG. 10 may be inferred with reference to the descriptions related to the channel circuit 900, the latch 310 and the output buffer circuit 450 illustrated in FIG. 9 and thus, will not be repeated. The data latch circuit 1020_a_, the data latch circuit 1020_b_, the data latch circuit 1020_c_ and the data latch circuit 1020_d_ illustrated in FIG. 10 may be inferred with reference to the descriptions related to the data latch circuit 320_a_ and the data latch circuit 320_b_ illustrated in FIG. 9, and the DAC 330_a_, the DAC 330_b_, the DAC 330_c_ and the DAC 330_d_ illustrated in FIG. 10 may be inferred with reference to the descriptions related to the DAC 330_a_ and the DAC 330_b_ illustrated in FIG. 9, the switch 340_a_, the switch 340_b_, and the switch 340_c_ and the switch 340_d_ illustrated in FIG. 10 may be inferred with reference to the descriptions related to the switch 340_a_ and the switch 340_b_ illustrated in FIG. 9, which will not be repeatedly described. A gamma voltage generation circuit (not shown) may provide a plurality of groups of gamma voltage levels respectively to the DACs 330_a_, 330_b_, 330_c_, and 330_d_. In some embodiments, each DAC can be operated in a sub-range of a whole gamma voltage range output by the gamma voltage generation circuit. For example, the DACs 330_a_, 330_b_, 330_c_, and 330_d_ can receive 192-255, 128-191, 64-127, and 0-64 gamma voltage levels, respectively.

In the embodiment illustrated in FIG. 10, an output terminal of the data latch circuit 1020_a_ is coupled to the input terminal of the DAC 330_a_, an output terminal of the data latch circuit 1020_b_ is coupled to the input terminal of the DAC 330_b_, an output terminal of the data latch circuit 1020_c_ is coupled to an input terminal of the DAC 330_c_, and an output terminal of the data latch circuit 1020_d_ is coupled to an input terminal of the DAC 330_d_. An output terminal of the DAC 330_a_ is coupled to a first input terminal of the output buffer circuit 1050, an output terminal of the DAC 330_b_ is coupled to a second input terminal of the output buffer circuit 1050, an output terminal of the DAC 330_c_ is coupled to a third input terminal of the output buffer circuit 1050, and an output terminal of the DAC 330_d_ is coupled to a fourth input terminal of the output buffer circuit 1050.

In the embodiment illustrated in FIG. 10, the output buffer circuit 1050 includes an input stage circuit 451_a_, an input stage circuit 451_b_, an input stage circuit 451_c_, an input stage circuit 451_d_ and a gain and output stage circuit 452. The input stage circuit 451_a_, the input stage circuit 451_b_, the input stage circuit 451_c_ and the input stage circuit 451_d_ illustrated in FIG. 10 may be inferred with reference to the descriptions related to the input stage circuit 451_a_ and the input stage circuit 451_b_ illustrated in FIG. 9, and the gain and output stage circuit 452 illustrated in FIG. 10 may be inferred with reference to the description related to the gain and output stage circuit 452 illustrated in FIG. 9, which will not be repeatedly described. In such an implementation, the gain and output stage circuit 452 can be shared by the input stage circuits 451_a_, 451_b_, 451_c_ and 451_d_. One of the four output signals generated by the input stage circuits 451_a_, 451_b_, 451_c_ and 451_d_ can reach the gain and output stage circuit 452 according to which of the switches 340_a_, 340_b_, 340_c_, and 340_d_ is turned on.

In the embodiment illustrated in FIG. 10, the data latch circuit 1020_a_ includes a latch 321_a_, a level shifter 322_a_ and a combinational logic circuit 1023_a_, the data latch circuit 320_b_ includes a latch 321_b_, a level shifter 322_b_ and a combinational logic circuit 1023_b_, the data latch circuit 320_c_ includes a latch 321_c_, a level shifter 322_c_ and a combinational logic circuit 1023_c_, and the data latch circuit 320_d_ includes a latch 321_d_, a level shifter 322_d_ and a combinational logic circuit 1023_d_. The latch 321_a_, the latch 321_b_, the latch 321_c_ and the latch 321_d_ illustrated in FIG. 10 may be inferred with reference to the descriptions related to the latch 321_a_ and the latch 321_b_ illustrated in FIG. 9, and the level shifter 322_a_, the level shifter 322_b_, the level shifter 322_c_ and the level shifter 322_d_ illustrated in FIG. 10 may be inferred with reference to the descriptions related to the level shifter 322*a* and the level shifter 322*b* illustrated in FIG. 9, which will not be repeatedly described. In such an implementation, each of the latches 321*a*-321*d*, under the control of combinational logic circuits 1023*a*-1023*d*, can be responsible for latching a respective sub-range of a whole range of the data output by the latch 310. For example, the latch 310 can latch 8 bits of data. At least one bit of the 8 bits data (e.g., 2 MSB bits) output from the latch 310 can be provided to each of the combinational logic circuits 1023*a*-1023*d* and 6 bits of the 8 bits data output from the latch 310 can be provided to each of the latches 321*a*-321*d*. In addition, each of the combinational logic circuits 1023*a*-1023*d* can provide at least one bit of data (e.g., 1 bit) to a corresponding one of the latches 321*a*-321*d*. Accordingly, each of the latches 321*a*-321*d* can latch 7 bits of data (one bit from the corresponding combinational logic circuit and the other 6 bits from the latch 310) and can then can be responsible for latching a respective sub-range of a whole range of the data output by the latch 310 according to the one bit from the corresponding combinational logic circuit. One bit output from each of the latches 321*a*-321*d* can be provided to a corresponding one of the switches 340*a*-340*d*, and 6 bits output from each of the latches 321*a*-321*d* can be provided to a corresponding one of the DACs 330*a*-330*d*.

In the embodiment illustrated in FIG. 10, the pixel data PD includes a first respective part of bit data PD2 and a second respective part of bit data PD1. For descriptive convenience, it is assumed herein that the second respective part of bit data PD1 includes the MSB of the pixel data PD (having two bits), and the first respective part of bit data PD2 includes other valid bits of the pixel data PD.

In the embodiment illustrated in FIG. 10, the value range of the pixel data PD may be divided into a first sub-range, a second sub-range, a third sub-range and a fourth sub-range. The first sub-range, the second sub-range, the third sub-range and the fourth sub-range may be defined according to a design requirement. The output voltage range of the DAC 330*a*, the output voltage range of the DAC 330*b*, an output voltage range of the DAC 330*c* and an output voltage range of the DAC 330*d* are different from one another. The output voltage range of the DAC 330*a* is related to the first sub-range of the pixel data PD, the output voltage range of the DAC 330*b* is related to the second sub-range of the pixel data PD, the output voltage range of the DAC 330*c* is related to the third sub-range of the pixel data PD, and the output voltage range of the DAC 330*d* is related to the fourth sub-range of the pixel data PD.

The combinational logic circuit 1023*a* illustrated in FIG. 10 may determine whether the pixel data PD belongs to the first sub-range according to the second respective part of bit data PD1 of the pixel data PD and output a determination result to the latch 321*a*. The combinational logic circuit 1023*b* may determine whether the pixel data PD belongs to the second sub-range according to the second respective part of bit data PD1 of the pixel data PD and output a determination result to the latch 321*b*. The combinational logic circuit 1023*c* may determine whether the pixel data PD belongs to the third sub-range according to the second respective part of bit data PD1 of the pixel data PD and output a determination result to the latch 321*c*. The combinational logic circuit 1023*d* may determine whether the pixel data PD belongs to the fourth sub-range according to the second respective part of bit data PD1 of the pixel data PD and output a determination result to the latch 321*d*.

When the determination result of the combinational logic circuit 1023*a* indicates that the pixel data PD belongs to the first sub-range, and the loading signal LD is enabled, the latch 321*a* may latch and output the first respective part of bit data PD2 of the pixel data PD. When the pixel data PD belongs to the first sub-range, an output terminal of the output buffer circuit 1050 may select to output a first driving signal related to a signal of the first input terminal of the output buffer circuit 1050. When the determination result of the combinational logic circuit 1023*b* indicates that the pixel data PD belongs to the second sub-range, and the loading signal LD is enabled, the latch 321*b* may latch and output the first respective part of bit data PD2 of the pixel data PD. When the pixel data PD belongs to the second sub-range, the output terminal of the output buffer circuit 1050 may select to output a second driving signal related to a signal of the second input terminal of the output buffer circuit 1050. When the determination result of the combinational logic circuit 1023*c* indicates that the pixel data PD belongs to the third sub-range, and the loading signal LD is enabled, the latch 321*c* may latch and output the first respective part of bit data PD2 of the pixel data PD. When the pixel data PD belongs to the third sub-range, the output terminal of the output buffer circuit 1050 may select to output a third driving signal related to a signal of the third input terminal of the output buffer circuit 1050. When the determination result of the combinational logic circuit 1023*d* indicates that the pixel data PD belongs to the fourth sub-range, and the loading signal LD is enabled, the latch 321*d* may latch and output the first respective part of bit data PD2 of the pixel data PD. When the pixel data PD belongs to the fourth sub-range, the output terminal of the output buffer circuit 1050 may select to output a fourth driving signal related to a signal of the fourth input terminal of the output buffer circuit 1050.

Figure 11:
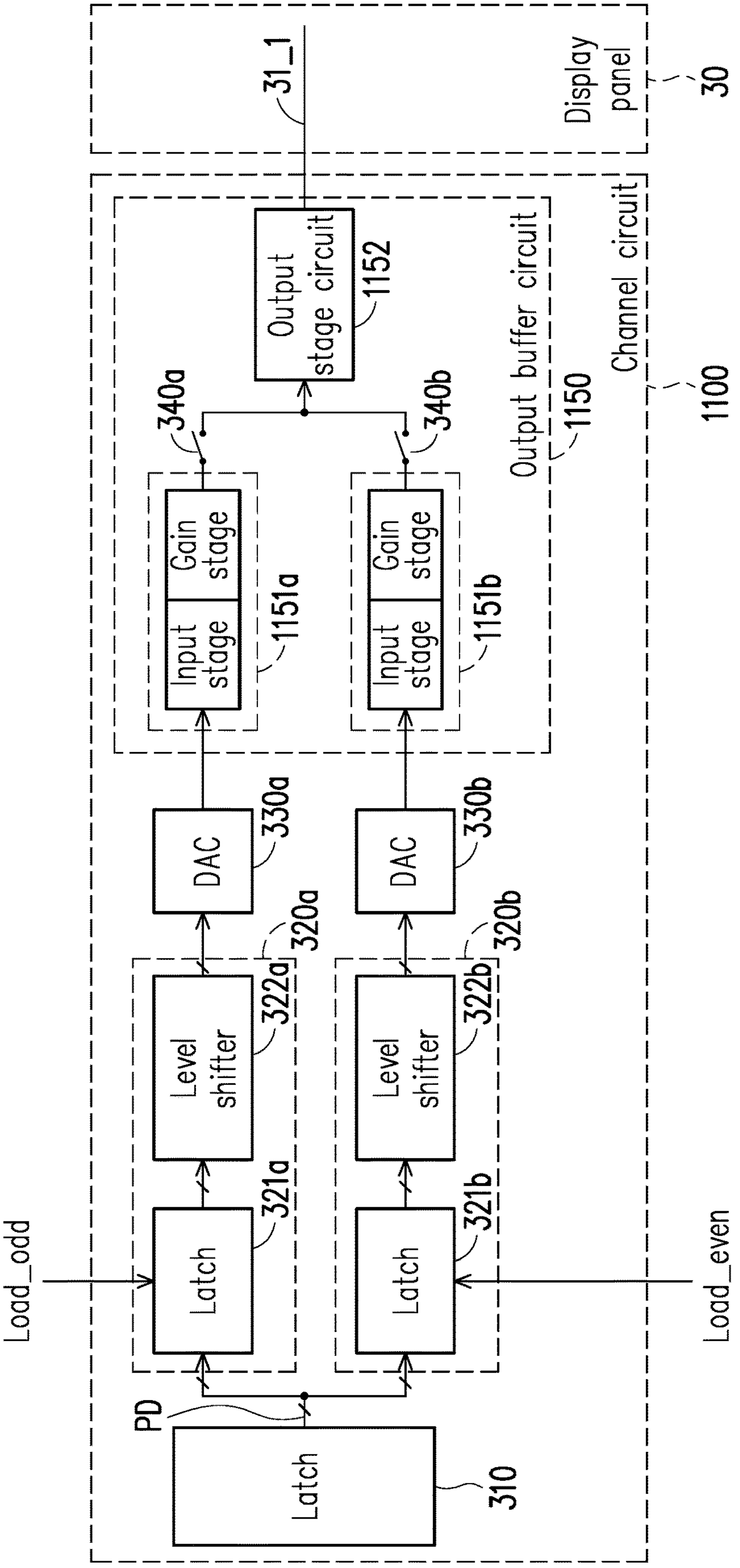
FIG. 11 is a schematic circuit block diagram illustrating a channel circuit according to further another embodiment of the invention.

FIG. 11 is a schematic circuit block diagram illustrating a channel circuit 1100 according to further another embodiment of the invention. The channel circuit 1100 illustrated in FIG. 11 may be inferred with reference to the description related to the channel circuit 210_1 illustrated in FIG. 2, the channel circuit 300 illustrated in FIG. 3 or the channel circuit 400 illustrated in FIG. 4. In the embodiment illustrated in FIG. 11, the channel circuit 1100 includes a latch 310, a data latch circuit 320*a*, a data latch circuit 320*b*, a DAC 330*a*, a DAC 330*b*, a switch 340*a*, a switch 340*b* and an output buffer circuit 1150. The latch 310, the data latch circuit 320*a*, the data latch circuit 320*b*, the DAC 330*a*, the DAC 330*b*, the switch 340*a* and the switch 340*b* illustrated in FIG. 11 may be inferred with reference to the descriptions related to the latch 310, the data latch circuit 320*a*, the data latch circuit 320*b*, the DAC 330*a*, the DAC 330*b*, the switch 340*a* and the switch 340*b* illustrated in FIG. 4 and thus, will not be repeated.

In the embodiment illustrated in FIG. 11, the output buffer circuit 1150 includes an input and gain stage circuit 1151*a*, an input and gain stage circuit 1151*b* and an output stage circuit 1152. The implementation manners of the input and gain stage circuit 1151*a*, the input and gain stage circuit 1151*b* and the output stage circuit 1152 are not limited in the present embodiment. For example, in some embodiments, the input and gain stage circuit 1151*a* and/or the input and gain stage circuit 1151*b* may include an input stage circuit and a gain stage circuit of a conventional amplifier, or the input and gain stage circuit 1151*a* and/or the input and gain stage circuit 1151*b* may be other types of input stage circuits. The output stage circuit 1152 may include an output stage circuit (or other types of output stage circuits) of a conventional amplifier. In such an implementation, the output stage circuit 1152 can be shared by the input and gain stage circuit 1151*a* and the input and gain stage circuit 1151*b*. One of the two output signals generated by the input and gain stage circuit 1151*a* and the input and gain stage circuit 1151*b* can reach the output stage circuit 1152 according to which of the switch 340*a* and the switch 340*b* is turned on.

An input terminal of the input and gain stage circuit 1151*a* may serve as a first input terminal of the output buffer circuit 1150, i.e., the input terminal of the input and gain stage circuit 1151*a* may be coupled to the output terminal of the DAC 330*a*. The first terminal of the switch 340*a* is coupled to an output terminal of the input and gain stage circuit 1151*a*. An input terminal of the input and gain stage circuit 1151*b* may serve as a second input terminal of the output buffer circuit 1150, i.e., the input terminal of the input and gain stage circuit 1151*b* may be coupled to the output terminal of the DAC 330*b*. The first terminal of the switch 340*b* is coupled to an output terminal of the input and gain stage circuit 1151*b*. An input terminal of the output stage circuit 1152 is coupled to the second terminal of the switch 340*a* and the second terminal of the switch 340*b*. An output terminal of the output stage circuit 1152 may serve as an output terminal of the output buffer circuit 1150.

During a first period, the DAC 330*a* may output a gamma voltage to the input terminal of the input and gain stage circuit 1151*a*, the switch 340*a* is turned on, and the switch 340*b* is turned off, such that the output stage circuit 1152 may select to output a first driving signal related to a single of the input terminal of the input and gain stage circuit 1151*a* to the data line 31_1. During the first period, the data latch circuit 320*b* may latch and output the respective part of or all of the bit data of the pixel data to the input terminal of the DAC 330*b*, such that the DAC 330*b* may pre-charge the input terminal of the input and gain stage circuit 1151*b*.

During a second period after the first period, the data latch circuit 320*a* may latch and output the respective part of or all of the bit data of the pixel data to the input terminal of the DAC 330*a*, such that the DAC 330*a* may pre-charge the input terminal of the input and gain stage circuit 1151*a*. During the second period, the DAC 330*b* may output a gamma voltage to the input terminal of the input and gain stage circuit 1151*b*, the switch 340*a* is turned off, and the switch 340*b* is turned on, such that the output stage circuit 1152 may select to output a second driving signal related to a signal of the input terminal of the input and gain stage circuit 1151*b* to the data line 31_1.

Figure 12:
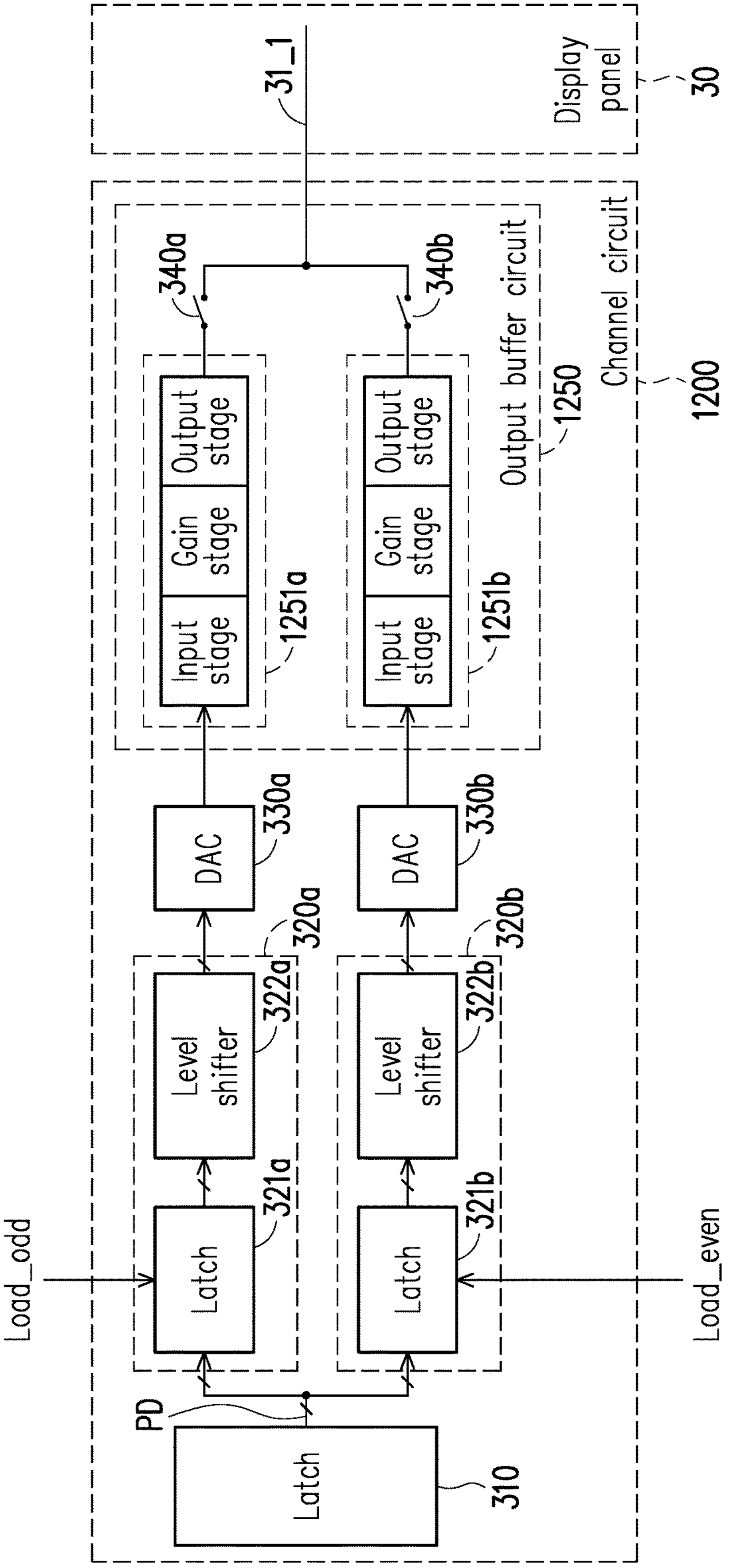
FIG. 12 is a schematic circuit block diagram illustrating a channel circuit according to still another embodiment of the invention.

FIG. 12 is a schematic circuit block diagram illustrating a channel circuit 1200 according to still another embodiment of the invention. The channel circuit 1200 illustrated in FIG. 12 may be inferred with reference to the description related to the channel circuit 210_1 illustrated in FIG. 2, the channel circuit 300 illustrated in FIG. 3 or the channel circuit 400 illustrated in FIG. 4. In the embodiment illustrated in FIG. 12, the channel circuit 1200 includes a latch 310, a data latch circuit 320*a*, a data latch circuit 320*b*, a DAC 330*a*, a DAC 330*b*, a switch 340*a*, a switch 340*b* and an output buffer circuit 1250. The latch 310, the data latch circuit 320*a*, the data latch circuit 320*b*, the DAC 330*a*, the DAC 330*b*, the switch 340*a* and the switch 340*b* illustrated in FIG. 12 may be inferred with reference to the descriptions related to the latch 310, the data latch circuit 320*a*, the data latch circuit 320*b*, the DAC 330*a*, the DAC 330*b*, the switch 340*a* and the switch 340*b* illustrated in FIG. 4 and thus, will not be repeated.

In the embodiment illustrated in FIG. 12, the output buffer circuit 1250 includes an output buffer 1251*a* and an output buffer 1251*b*. The implementation manners of the output buffer 1251*a* and the output buffer 1251*b* are not limited in the present embodiment. For example, in some embodiments, the output buffer 1251*a* and the output buffer 1251*b* may include conventional output buffers or other types of output buffer circuits. An input terminal of the output buffer 1251*a* may serve as a first input terminal of the output buffer circuit 1250, i.e., the input terminal of the output buffer 1251*a* may be coupled to the output terminal of the DAC 330*a*. The first terminal of the switch 340*a* is coupled to an output terminal of the output buffer 1251*a*. The second terminal of the switch 340*a* may serve as an output terminal of the output buffer circuit 1250. An input terminal of the output buffer 1251*b* may serve as a second input terminal of the output buffer circuit 1250, i.e., the input terminal of the output buffer 1251*b* may be coupled to the output terminal of the DAC 330*b*. The first terminal of the switch 340*b* is coupled to an output terminal of the output buffer 1251*b*. The second terminal of the switch 340*b* is coupled to the second terminal of the switch 340*a*. In such an implementation, there are respective output stages in the output buffer 1251*a* and the output buffer 1251*b*. One of the two output signals generated by the output buffer 1251*a* and the output buffer 1251*b* can reach the display panel 30 according to which of the switch 340*a* and the switch 340*b* is turned on.

During a first period, the DAC 330*a* may output a gamma voltage to the input terminal of the output buffer 1251*a*, the switch 340*a* is turned on, and the switch 340*b* is turned off, such that the output buffer 1251*a* may select to output a first driving signal related to a signal of the input terminal of the output buffer 1251*a* to the data line 31_1. During the first period, the data latch circuit 320*b* may latch and output the respective part of or all of the bit data of the pixel data to the input terminal of the DAC 330*b*, such that the DAC 330*b* may pre-charge the input terminal of the output buffer 1251*b*.

During a second period after the first period, the data latch circuit 320*a* may latch and output the respective part of or all of the bit data of the pixel data to the input terminal of the DAC 330*a*, such that the DAC 330*a* may pre-charge the input terminal of the output buffer 1251*a*. During the second period, the DAC 330*b* may output a gamma voltage to the input terminal of the output buffer 1251*b*, the switch 340*a* is turned off, and the switch 340*b* is turned on, such that the output buffer 1251*b* may select to output a second driving signal related to a signal of the input terminal of the output buffer 1251*b* to the data line 31_1.

In view of the foregoing, the channel circuit of the source driver provided by the embodiments of the invention has the plurality of digital-to-analog converters. Any one of the digital-to-analog converters can charge or discharge (i.e., output an analog signal to) a corresponding signal path among the plurality of signal paths of the output buffer circuit. When one of the digital-to-analog converters charges or discharges one of the signal paths, another corresponding signal path among the signal paths of the output buffer circuit can provide a corresponding driving signal to the data line of the display panel. The switching operation among the signal paths can facilitate increasing the operation frequency of the display panel.

Although the invention has been described with reference to the above embodiments, it will be apparent to one of the ordinary skill in the art that modifications to the described embodiment may be made without descriptive parting from the spirit of the invention. Accordingly, the scope of the invention will be defined by the attached claims not by the above detailed descriptions.

What is claimed is:

1. A source driver, comprising:

a plurality of channel circuits, each of the channel circuits comprising:

an output buffer circuit, having a first input terminal, a second input terminal and an output terminal, wherein the output terminal of the output buffer circuit is configured to output a driving voltage according to a gamma voltage to a data line of a display panel in a scan line period;

a first digital-to-analog converter and a second digital-to-analog converter, wherein an output terminal of the first digital-to-analog converter is coupled to the first input terminal of the output buffer circuit, and an output terminal of the second digital-to-analog converter is coupled to the second input terminal of the output buffer circuit;

a first switch, disposed along a first signal path between the output terminal of the first digital-to-analog converter and the output terminal of the output buffer circuit; and a second switch, disposed along a second signal path between the output terminal of the second digital-to-analog converter and the output terminal of the output buffer circuit, wherein when a value of pixel data falls within a first sub-range, the first digital-to-analog converter is configured to convert the pixel data to output a first gamma voltage which falls in a first output voltage range, and when the value of the pixel data falls within second sub-range, the second digital-to-analog converter is configured to convert the pixel data to output a second gamma voltage which falls in a second output voltage range, wherein the first output voltage range of the first digital-to-analog converter is different from the second output voltage range of the second digital-to-analog converter.

2. The source driver according to claim 1, wherein:

a value range of the pixel data is divided into a plurality of sub-ranges, wherein the sub-ranges comprise the first sub-range and the second sub-range; and the first output voltage range corresponds to the first sub-range, and the second output voltage range corresponds to the second sub-range.

3. The source driver according to claim 2, further comprising a gamma circuit configured to provide a first gamma voltage having a first level range and a second gamma voltage having a second level range respectively to the first digital-to-analog converter and the second digital-to-analog converter, wherein the first level range is different from the second level range.

4. The source driver according to claim 2, wherein the first sub-range and the second sub-range are a high range and a lower range of the value range of the pixel data, respectively.

5. The source driver according to claim 2, wherein the first sub-range is different from the second sub-range.

6. The source driver according to claim 2, wherein when a value of pixel data falls within the first sub-range, the first digital-to-analog converter converts the pixel data, and when the value of pixel data does not fall within the first sub-range, the first digital-to-analog converter does not convert the pixel data; and when the value of pixel data falls within the second sub-range, the second digital-to-analog converter converts the pixel data, and when the value of pixel data does not fall within the second sub-range, the second digital-to-analog converter does not convert the pixel data.

7. The source driver according to claim 2, each of the channel circuits further comprising:

a first data latch circuit and a second data latch circuit, wherein an input terminal of each of the first data latch circuit and the second data latch circuit is configured to receive bit data of pixel data, an output terminal of the first data latch circuit is coupled to an input terminal of the first digital-to-analog converter, and an output terminal of the second data latch circuit is coupled to an input terminal of the second digital-to-analog converter.

8. The source driver according to claim 7, wherein:

during a first period, the output buffer circuit selects to output a first driving signal related to a signal of the first input terminal of the output buffer circuit via the output terminal of the output buffer circuit, and the second data latch circuit latches and outputs the bit data of the pixel data to the input terminal of the second digital-to-analog converter; and during a second period, the first data latch circuit latches and outputs the bit data of the pixel data to the input terminal of the first digital-to-analog converter, and the output buffer circuit selects to output a second driving signal related to a signal of the second input terminal of the output buffer circuit via the output terminal of the output buffer circuit.

9. The source driver according to claim 8, wherein:

the first data latch circuit and the second data latch circuit receive the bit data of the pixel data from a level shifter;

when the pixel data belongs to the first sub-range, the first data latch circuit latches and outputs the bit data of the pixel data to the input terminal of the first digital-to-analog converter; and when the pixel data belongs to the second sub-range, the second data latch circuit latches and outputs the bit data of the pixel data to the input terminal of the second digital-to-analog converter.

10. The source driver according to claim 7, wherein the first data latch circuit comprises:

a first latch, having an input terminal, an output terminal and a control terminal, wherein the input terminal of the first latch is configured to receive the bit data of the pixel data, and the control terminal of the first latch is controlled by a first loading signal; and a first level shifter, having an input terminal and an output terminal, wherein the input terminal of the first level shifter is coupled to the output terminal of the first latch, and the output terminal of the first level shifter is coupled to the input terminal of the first digital-to-analog converter.

11. The source driver according to claim 10, wherein the second data latch circuit comprises:

a second latch, having an input terminal, an output terminal and a control terminal, wherein the input terminal of the second latch is configured to receive the bit data of the pixel data, and the control terminal of the second latch is controlled by a second loading signal; and a second level shifter, having an input terminal and an output terminal, wherein the input terminal of the second level shifter is coupled to the output terminal of the second latch, and the output terminal of the second level shifter is coupled to the input terminal of the second digital-to-analog converter.

12. The source driver according to claim 7, wherein when the pixel data belongs to the first sub-range, the first data latch circuit latches and outputs the bit data of the pixel data to the input terminal of the first digital-to-analog converter, and the output buffer circuit selects to output a first driving signal related to a signal of the first input terminal of the output buffer circuit via the output terminal of the output buffer circuit; and when the pixel data belongs to the second sub-range, the second data latch circuit latches and outputs the bit data of the pixel data to the input terminal of the second digital-to-analog converter, and the output buffer circuit selects to output a second driving signal related to a signal of the second input terminal of the output buffer circuit via the output terminal of the output buffer circuit.

13. The source driver according to claim 7, wherein the first data latch circuit comprises:

a first latch, having an input terminal and an output terminal, wherein the input terminal of the first latch is configured to receive the bit data of the pixel data, and when the pixel data belongs to the first sub-range and a loading signal is enabled, the first latch latches and outputs the bit data of the pixel data; and a first level shifter, having an input terminal and an output terminal, wherein the input terminal of the first level shifter is coupled to the output terminal of the first latch, and the output terminal of the first level shifter is coupled to the input terminal of the first digital-to-analog converter.

14. The source driver according to claim 13, wherein the second data latch circuit comprises:

a second latch, having an input terminal and an output terminal, wherein the input terminal of the second latch is configured to receive the bit data of the pixel data, and when the pixel data belongs to the second sub-range and the loading signal is enabled, the second latch latches and outputs the bit data of the pixel data; and a second level shifter, having an input terminal and an output terminal, wherein the input terminal of the second level shifter is coupled to the output terminal of the second latch, and the output terminal of the second level shifter is coupled to the input terminal of the second digital-to-analog converter.

15. The source driver according to claim 1, wherein for each value of pixel data, one of the first digital-to-analog converter and the second digital-to-analog converter converts the pixel data, and the other one of the first digital-to-analog converter and the second digital-to-analog converter does not convert the pixel data.

16. The source driver according to claim 1, each of the channel circuits further comprising:

a first data latch circuit and a second data latch circuit, an output terminal of the first data latch circuit is coupled to an input terminal of the first digital-to-analog converter, and an output terminal of the second data latch circuit is coupled to an input terminal of the second digital-to-analog converter, and wherein the first data latch circuit is configured to load data according to at least one bit of the pixel data and a loading signal, and the second data latch circuit is configured to load data according to at least one bit of the pixel data and the loading signal.

17. The source driver according to claim 16, wherein a time length of a loading period for the loading signal is equal to a time length of a line latching period for each of the first data latch circuit and the second data latch circuit.

18. The source driver according to claim 16, wherein a first switching timing for the first switch depends upon the at least one bit of the pixel data and a second switching timing for the second switch depends upon the at least one bit of the pixel data.

19. The source driver according to claim 1, wherein for each value of the pixel data, each of the first digital-to-analog converter and the second digital-to-analog converter converts the pixel data depends upon the value of the pixel data.

20. The source driver according to claim 1, each of the channel circuits further comprising a first data latch circuit and a second data latch circuit, an output terminal of the first data latch circuit is coupled to an input terminal of the first digital-to-analog converter, and an output terminal of the second data latch circuit is coupled to an input terminal of the second digital-to-analog converter, and wherein the first data latch circuit is configured to load data according to a first loading timing depending upon a first switching timing of the first switch, and the second data latch circuit is configured to load data according to a second loading timing depending upon a second switching timing of the second switch.

21. The source driver according to claim 20, wherein each of the first loading timing and the second loading timing depends upon a location of the pixel data in a frame.

22. The source driver according to claim 20, wherein each of the first loading timing and the second loading timing depends upon at least one bit of the pixel data.

23. The source driver according to claim 1, wherein the output buffer circuit comprises:

a first input stage circuit, having an input terminal and an output terminal, wherein the input terminal of the first input stage circuit is employed as or coupled to the first input terminal of the output buffer circuit, and a first terminal of the first switch is coupled to the output terminal of the first input stage circuit;

a second input stage circuit, having an input terminal and an output terminal, wherein the input terminal of second input stage circuit is employed as or coupled to the second input terminal of the output buffer circuit, and a first terminal of the second switch is coupled to the output terminal of the second input stage circuit; and a gain and output stage circuit, having an input terminal and an output terminal, wherein the input terminal of the gain and output stage circuit is coupled to a second terminal of the first switch and a second terminal of the second switch, and the output terminal of the gain and output stage circuit is employed as or coupled to the output terminal of the output buffer circuit.

24. A source driver, comprising:

a plurality of channel circuits, each of the channel circuits comprising:

an output buffer circuit, at least having a plurality of input terminals and an output terminal, wherein the output terminal of the output buffer circuit is configured to be coupled to a data line of a display panel;

a plurality of digital-to-analog converters, comprising a first digital-to-analog converter and a second digital-to-analog converter, wherein an output terminal of the first digital-to-analog converter is coupled to a first input terminal among the input terminals of the output buffer circuit, and an output terminal of the second digital-to-analog converter is coupled to a second input terminal among the input terminals of the output buffer circuit, wherein when a value of pixel data falls within a first sub-range, the first digital-to-analog converter is configured to convert the pixel data to output a first gamma voltage which falls in a first output voltage range, and when the value of the pixel data falls within second sub-range, the second digital-to-analog converter is configured to convert the pixel data to output a second gamma voltage which falls in a second output voltage range;

wherein for each value of the pixel data, one of the first digital-to-analog converter and the second digital-to-analog converts the pixel data and the other one of the first digital-to-analog converter and the second digital-to-analog does not convert the pixel data, and each of the first digital-to-analog converter and the second digital-to-analog converts the pixel data depends upon the value of the pixel data.

* * * * *